US008477742B2

(12) United States Patent
Grilli et al.

(10) Patent No.: US 8,477,742 B2
(45) Date of Patent: Jul. 2, 2013

(54) METHOD AND APPARATUS FOR TIME-ALIGNING TRANSMISSIONS FROM MULTIPLE BASE STATIONS IN A CDMA COMMUNICATION SYSTEM

(75) Inventors: Francesco Grilli, San Diego, CA (US); Charles E. Wheatley, III, San Diego, CA (US); Serge Willenegger, Onnens (SE); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 597 days.

(21) Appl. No.: 12/772,792

(22) Filed: May 3, 2010

(65) Prior Publication Data
US 2010/0260155 A1 Oct. 14, 2010

Related U.S. Application Data

(60) Division of application No. 12/196,489, filed on Aug. 22, 2008, now Pat. No. 7,903,633, which is a continuation of application No. 10/414,578, filed on Apr. 15, 2003, now Pat. No. 7,433,321, which is a continuation-in-part of application No. 09/901,831, filed on Jul. 9, 2001, now Pat. No. 6,775,242.

(51) Int. Cl.
*H04W 56/00* (2009.01)
(52) U.S. Cl.
USPC .......................................... 370/336; 370/350
(58) Field of Classification Search
USPC ................... 370/336, 350, 503, 506
See application file for complete search history.

(56) References Cited

U.S. PATENT DOCUMENTS

| | | | |
|---|---|---|---|
| 5,872,774 A | 2/1999 | Wheatley, III | |
| 6,094,421 A | 7/2000 | Scott | |
| 6,137,773 A * | 10/2000 | Stilwell et al. | 370/209 |
| 6,208,871 B1 | 3/2001 | Hall et al. | |

(Continued)

FOREIGN PATENT DOCUMENTS

| | | |
|---|---|---|
| WO | WO9941854 | 8/1999 |
| WO | WO0014907 | 3/2000 |
| WO | WO0041907 A1 | 7/2000 |

OTHER PUBLICATIONS

3GPP TS 25.133 V3 4.0 (Dec. 2000) Release 1999; Technical Specification Group Radio Access Networks; "Requirements for Support of Radio Resource Management" (FDD).

(Continued)

*Primary Examiner* — Brian D Nguyen
(74) *Attorney, Agent, or Firm* — Kam T. Tam

(57) ABSTRACT

Schemes to time-align transmissions from multiple base stations to a terminal. To achieve time-alignment, differences between the arrival times of transmissions from the base stations, as observed at the terminal, are determined and provided to the system and used to adjust the timing at the base stations such that terminal-specific radio frames arrive at the terminal within a particular time window. In one scheme, a time difference between two base stations is partitioned into a frame-level time difference and a chip-level time difference. Whenever requested to perform and report time difference measurements, the terminal measures the chip-level timing for each candidate base station relative to a reference base station. Additionally, the terminal also measures the frame-level timing and includes this information in the time difference measurement only if required. Otherwise, the terminal sets the frame-level part to a predetermined value (e.g., zero).

15 Claims, 11 Drawing Sheets

U.S. PATENT DOCUMENTS

| | | | |
|---|---|---|---|
| 6,259,683 | B1 | 7/2001 | Sekine et al. |
| 6,304,623 | B1* | 10/2001 | Richards et al. ............... 375/355 |
| 6,344,821 | B2 | 2/2002 | Norimatsu |
| 6,356,555 | B1* | 3/2002 | Rakib et al. ................... 370/441 |
| 6,430,413 | B1 | 8/2002 | Wedi et al. |
| 6,483,825 | B2 | 11/2002 | Seta |
| 6,526,039 | B1 | 2/2003 | Dahlman et al. |
| 6,577,872 | B1* | 6/2003 | Lundh et al. ................... 455/502 |
| 6,665,540 | B2 | 12/2003 | Rantalainen et al. |
| 6,681,099 | B1 | 1/2004 | Keranen et al. |
| 6,711,149 | B1* | 3/2004 | Yano et al. .................... 370/342 |
| 6,775,242 | B2 | 8/2004 | Grilli et al. |
| 6,892,071 | B2 | 5/2005 | Park et al. |
| 6,947,757 | B2 | 9/2005 | Pihl et al. |
| 6,980,615 | B2 | 12/2005 | Dick et al. |
| 7,047,011 | B1 | 5/2006 | Wikman |
| 7,209,463 | B2 | 4/2007 | Park et al. |
| 7,254,401 | B2 | 8/2007 | Keranen et al. |
| 2001/0005177 | A1 | 6/2001 | Norimatsu |
| 2001/0021179 | A1* | 9/2001 | Tiedemann et al. .......... 370/333 |
| 2001/0051527 | A1 | 12/2001 | Kuwahara et al. |
| 2002/0042272 | A1 | 4/2002 | Wedi et al. |
| 2002/0045448 | A1 | 4/2002 | Park et al. |
| 2002/0054611 | A1* | 5/2002 | Seta .............................. 370/503 |
| 2002/0075978 | A1 | 6/2002 | Dick et al. |
| 2002/0107028 | A1 | 8/2002 | Rantalainen et al. |
| 2002/0150182 | A1* | 10/2002 | Dogan et al. .................. 375/343 |
| 2002/0194539 | A1* | 12/2002 | Ellis et al. ........................ 714/30 |
| 2003/0002470 | A1 | 1/2003 | Park et al. |
| 2003/0117997 | A1 | 6/2003 | Kim |
| 2003/0186707 | A1 | 10/2003 | Pihl et al. |
| 2003/0210713 | A1 | 11/2003 | Abdel-Ghaffar |

OTHER PUBLICATIONS

3GPP TS 25.305 v5.1.0 (Jun. 2001) Release 5; Technical Specification Group Radio Access Network; Stage 2 Functional Specification of UE Positioning in UTRAN.

3GPP TS 25.331, v3.5.0 (Dec. 2000), Section 10.3.7.63. "SFN-SFN Observed Time Difference".

3GPP TS 25.331 v.3.7.0, (Jun. 2001) Section 10.3.7.106. "UE Positioning OTDOA Neighbor Cell Info".

3GPP TS 25.331 v4.1.0 (Jun. 2001) Release 4; Technical Specification Group Radio Access Network; "Radio Resource Control Protocol Specification".

3GPP TS 25.402, Section 5. "Universal Mobile Telecommunications System (UMTS); Synchronization in UTRAN Stage 2 (3GPP TS 25.402 version 4.1.0 Release 4)" ETSI TS 125 402; Jun. 2001, pp. 1-44.

3GPP TS 25.433 V4.0.0 (Mar. 2001) Release 4; Technical Specification Group Radio Access Network, "UTRAN lub Interface NBAP Signaling".

"3rd Generation Partnership Project; 1-10 Technical Specification Group Radio Access Network; Physical layer—Measurements (FDD) (Release 4)" 3GPP TS 25.215 V4.1.0, Jun. 2001, pp. 1-18, XP002217470 p. 6, paragraph 4 p. 9, paragraph 5.1.9.

European Search Report/Search Opinion—EP07017457—Search Authority, Munich, Nov. 18, 2009.

International Preliminary Examination Report—PCT/US02/021781, IPEA/US, Alexandria, VA Nov. 9, 2003.

International Search Report—PCT/US02/021781, International Search Authority—European Patent Office—Nov. 5, 2002.

International Search Report, EP1407562, Sep. 6, 2007.

International Search Report, WO0307508, Jan. 23, 2003.

"Universal Mobile Telecommunications System (UMTS), Requirements for Support of Radio Resource Management (FDD) (3GPP TS 25.133 version 4.1.0 Release 4); ETSI TS 125 133" ETSI Stds, Lis, Sophia Antipolis Cedex, France, vol. 3-R4, No. V4.1.0, Jun. 1, 2001, XP014008230 ISSN: 0000-0001, 9. Measurements Performance Requirements, 9.1.8 SFN-SFN observed time difference.

Wheatley, Chuck; Self-Synchronizing A CDMA Cellular Network, Microwave Journal, May 1999, 320-328.

* cited by examiner

Synchronous System Configuration (S1)

| BS #1 | 1201 | 1202 | 1203 | 1204 | 1205 | ••• |
|---|---|---|---|---|---|---|
| BS #2 | 1201 | 1202 | 1203 | 1204 | 1205 | ••• |
| BS #3 | 1201 | 1202 | 1203 | 1204 | 1205 | ••• |

Synchronous System Configuration (S2)

| BS #1 | 201 | 202 | 203 | 204 | 205 | ••• |
|---|---|---|---|---|---|---|
| BS #2 | 1157 | 1158 | 1159 | 1160 | 1161 | ••• |
| BS #3 | 3201 | 3202 | 3203 | 3204 | 3205 | ••• |

METHOD AND APPARATUS FOR TIME-ALIGNING TRANSMISSIONS FROM MULTIPLE BASE STATIONS IN A CDMA COMMUNICATION SYSTEM

PRIORITY CLAIM

In accordance with 35 U.S.C. §120, the present Application for Patent is a divisional of and claims priority to U.S. patent application Ser. No. 12/196,489 entitled "Method and Apparatus for Time-Aligning Transmissions from Multiple Base Stations in a CDMA Communication System," filed on Aug. 22, 2008, now U.S. Pat. No. 7,903,633, which was issued on Mar. 3, 2011, which application is a continuation of and claims priority to U.S. patent application Ser. No. 10/414,578 entitled "Method and Apparatus for Time-Aligning Transmissions from Multiple Base Stations in a CDMA Communication System," filed on Apr. 15, 2003, now U.S. Pat. No. 7,433,321, which was issued on Oct. 7, 2008, which application is a Continuation in Part and claims priority to U.S. patent application Ser. No. 09/901,831 entitled "Method and Apparatus for Time-Aligning Transmissions from Multiple Base Stations in a CDMA Communication System," filed Jul. 9, 2001, now U.S. Pat. No. 6,775,242, which was issued on Aug. 10, 2004, all of which are assigned to the assignee hereof and hereby expressly incorporated by reference herein.

BACKGROUND

I. Field

The present invention relates generally to data communication, and more specifically to techniques for time-aligning transmissions from multiple base stations in a CDMA communication system.

II. Background

Wireless communication systems are widely deployed to provide various types of communication including voice and packet data services. These systems may be based on code division multiple access (CDMA), time division multiple access (TDMA), or some other multiple access techniques. CDMA systems may provide certain advantages over other types of systems, including increased system capacity. A CDMA system is typically designed to conform to one or more standards, such as IS-95, cdma2000, and W-CDMA standards, which are known in the art.

A CDMA system may be operated to support voice and data communication. During a communication session (e.g., a voice call), a terminal may be in active communication with one or more base stations, which are placed in an "active set" of the terminal. While in soft handover (or soft handoff), the terminal concurrently communicates with multiple base stations, which may provide diversity against deleterious path effects. The terminal may else receive signals from one or more other base stations for other types of transmission such as, for example, pilot references, pages, broadcast messages, and so on.

In accordance with the W-CDMA standard, the base stations, are not required to be operated synchronously. When operated asynchronously, from a terminal's perspective, the timing (and thus, the radio frames) of the base stations may not be aligned and the reference time of each base station may be different from that of the other base stations.

While in soft handover, a terminal concurrently receives data transmissions (i.e., radio frames) from multiple base stations. To ensure that the radio frames arrive at the terminal within a particular time window so that they can be properly processed and recovered, the W-CDMA standard provides a mechanism whereby the starting time of the terminal-specific radio frames from each base station to the terminal can be adjusted. Typically, before a new base station is added to the terminal's active set, this base station's timing relative to that of a reference base station is determined by the terminal and reported to the system. The system then instructs the new base station to adjust its transmit timing for the terminal such that the radio frames transmitted from this new base station are approximately aligned in time to the radio frames from the other active base stations.

For the W-CDMA standard, the time difference between a new candidate base station and a reference base station can be reported via an "SFN-SFN observed time difference type 1 measurement" (where SFN denotes system frame number). This measurement includes two parts. The first part provides the chip-level timing between the two base stations, which can be derived by detecting the timing of the pseudo-noise (PN) sequences used to descramble the downlink signals from these base stations. The second part provides the frame-level timing between the two base stations, which can be derived by processing (i.e., demodulating and decoding) a broadcast channel transmitted by the base stations. These two pans are encapsulated into a report message that is transmitted from the terminal to the system.

In certain W-CDMA system configurations, only the chip-level timing is required to properly time-align the radio frames of a newly added base station. This may be true, for example, if the base stations are operated synchronously and the frame-level liming is already known by the system. In this case, requiring the terminal to measure and report the frame-level timing as well as the chip-level timing (as required by the current W-CDMA standard) may degrade performance.

SUMMARY

According to one embodiment of the present invention, a method in a communication system is provided. The method includes obtaining an absolute time measurement and a relative time measurement for each of a plurality of transmitters in the communication system, and determining time difference information for each of the plurality of transmitters based on the obtained absolute time measurements and relative time measurements. The determined time difference information corresponding to each of the plurality of transmitters is reported to a terminal communicating in the communication system.

According to another embodiment of the present invention, an apparatus in a communication system is provided. The apparatus includes means for obtaining an absolute time measurement and a relative time measurement for each of a plurality of transmitters in the communication system, and means for determining time difference information for each of the plurality of transmitters based on the obtained absolute time measurements and relative time measurements. The apparatus farther comprises means for reporting the determined time difference information corresponding to each of the plurality of transmitters to a terminal communicating in the communication system.

In another embodiment of the present invention, a digital signal processing device (DSPD) is provided. The DSPD is coupled to a memory for interpreting digital information stored on the memory to obtain an absolute time measurement and a relative time measurement for each of a plurality of transmitters in the communication system, and determine time difference information for each of the plurality of transmitters based on the obtained absolute time measurements and relative time measurements. The determined time difference information corresponding to each of the plurality of transmitters is reported to a terminal communicating in the communication system.

In another embodiment of the present invention, an apparatus in a wireless communication system is provided. The apparatus includes a controller for obtaining an absolute time measurement and a relative time measurement for each of a plurality of transmitters, and for determining time difference information for each of the plurality of transmitters based on the absolute time measurements and the relative time measurements obtained. The apparatus further comprises a communication unit for reporting the time difference information to a terminal communicating in the wireless communication system.

In another aspect of the present invention, a method in a CDMA communication system is provided. The method includes obtaining a system frame number (SFN) value for each of a plurality of base stations in the communication system, and obtaining a time difference measurement for each of the plurality of base stations. The method further comprises computing a time difference value for at least a first base station and one neighboring base station selected from the plurality of base stations based on the obtained SFN values and the time difference measurements, and reporting the computed time difference value to a terminal operating in the communication system.

In yet another embodiment of the present invention, a method in a wireless communication system is provided. The method includes obtaining a time difference value for at least a first base station selected from a plurality of base stations in the wireless communication system, the time difference value being a difference between a timing of the first base station and a timing of a reference base station in the wireless communication system. An actual timing of the first base station is estimated based on the time difference value obtained for the first base station and the timing of the reference base station. A search for the first base station by a terminal communicating within the wireless communication system is initiated based on the estimated actual timing for the first base station.

In yet another embodiment of the present invention, an apparatus in a wireless communication system is provided. The apparatus includes means for obtaining a time difference value for at least a first base station selected from a plurality of base stations in the wireless communication system, where the time difference value for the first base station is a difference between a timing of the first base station and a timing of a reference base station within the wireless communication system. The apparatus further comprises means for estimating an actual timing of the first base station based on the time difference value obtained for the first base station and the timing of the reference base station. The apparatus further includes means for initiating a search for the first base station by a terminal communicating within the wireless communication system based on the estimated actual timing for the first base station.

In yet another embodiment of the present invention, a terminal in a wireless communication system is provided. The terminal comprises a data processor for obtaining a time difference value for at least a first base station in the wireless communication system, wherein the time difference value for the first base station is a difference between a timing of the first base station and a timing of a reference base station within the wireless communication system. The terminal further comprises a controller for estimating an actual timing of the first base station based on the time difference value obtained for the first base station and the timing of the reference base station, and to initiate a search for the first base station based on the estimated actual timing for the first base station.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 2A through 2D are diagrams illustrating three different synchronous system configurations and an asynchronous system configuration.

DETAILED DESCRIPTION

Figure 1:
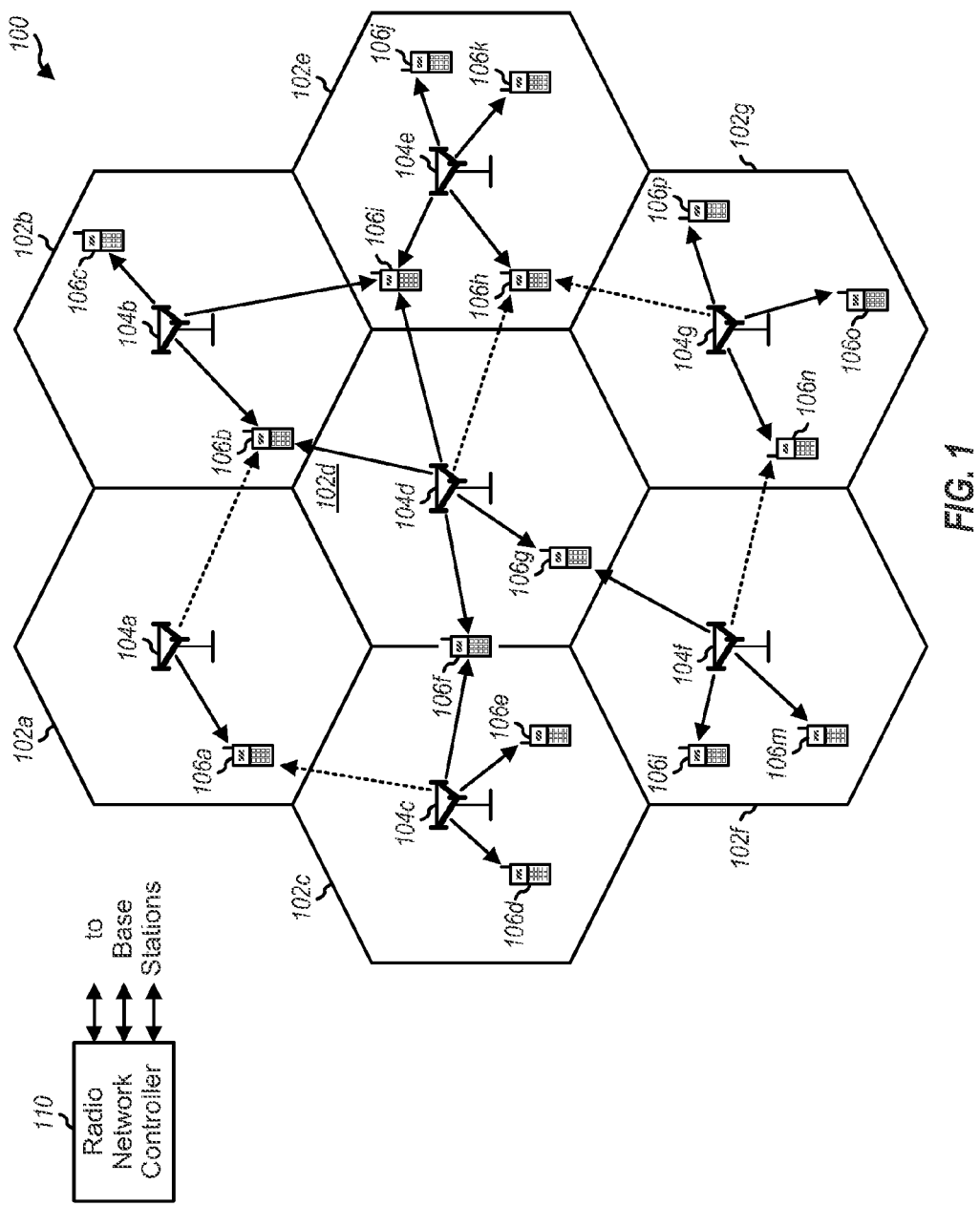
FIG. 1 is a diagram of an exemplary wireless communication system.

FIG. 1 is a diagram of an exemplary wireless communication system 100. System 100 includes a number of base stations 104 that provide coverage for a number of geographic regions 102. A base station is also commonly referred to as a base transceiver system (BTS), a Node B, an access point, or some other terminology. A base station and/or its coverage area are also often referred to as a "cell," depending on the context in which the term is used. System 100 may be designed to implement one or more CDMA standards, such as the IS-95, W-CDMA, cdma2000, and other standards, or a combination thereof.

As shown in FIG. 1, various terminals 106 are dispersed throughout the system. A terminal may also be referred to as a mobile station, a remote station, a User Equipment (UE), a wireless device, or some oilier terminology. Each terminal 106 may communicate with one or multiple base stations 104 on the downlink and/or one or multiple base stations on the uplink. The downlink (i.e., forward link) refers to the communication link from the base station to the terminal, and the uplink (i.e., reverse link) refers to the communication link from the terminal to the base station.

As shown in FIG. 1, base station 104a transmits to terminal 106a or the downlink, base station 104b transmits to terminals 106b, 106c and 106i, base station 104c transmits to terminals 106d, 106e and 106f, and so on. In FIG. 1, a solid line with an arrow indicates a user-specific data transmission from a base station to a terminal. A broken line with an arrow indicates that a terminal is receiving pilot and other signaling, but no user-specific data transmission, from a base station. As shown in FIG. 1, terminals 106b, 106f, 106g, and 106i are in soft handover, and each of these terminals concurrently communicates with multiple base stations on the downlink. The uplink communication is not shown in FIG. 1 for simplicity.

Each terminal includes an active set of a list of one or more "active" base stations with which the terminal communicates. These active base station(s) concurrently may transmit radio frames to the terminal. The transmission from each active base station is referred to as a Radio Link in W-CDMA terminology. One of the base stations in the active set is designated as a reference base station. For example, the terminal may designate the base station with the strongest received signal as the reference base station, or the system may indicate which is the reference base station in a common message or a dedicated message.

A radio network controller (RNC) 110 couples to base stations 104 and may further couple to other systems and networks such as, for example, a public switched telephone network (PSTN), a packet data network (PDN), and so on. RNC 110 may also be referred to as a base station controller (BSC) or some other terminology. RNC 110 provides coordination and control for the base stations coupled to it. RNC 110 further controls, via the base stations, the routing of calls (1) among the terminals in system 100 and (2) between the terminals in system 100 and other users coupled to other systems (e.g., the PSTN).

In accordance with the W-CDMA standard, the base stations in the system may be operated such that they are all synchronized to each other, or they may be operated such that they are asynchronous to each other. This choice of synchronous or asynchronous operation is dependent on the manner in which the system is operated by a network operator. A W-CDMA system may also be operated such that some of the base stations are synchronized while other base stations are not synchronized. Various possible configurations for the base stations in the system are described below.

FIG. 2A is a diagram illustrating a first system configuration (S1) in which a number of base stations (e.g., three in this example) are operated synchronously with time-aligned frame start and numbering. For this configuration, the radio frames on the common channels (i.e., common channel frames) for the base stations start at approximately the same time for each frame (i.e., at $t_n$, $t_{n+1}$, and so on). The common channels are channels used to transmit information to all terminals, and typically include the paging channel, broadcast channel, and so on. The synchronization between the base stations is denoted by the time relationship between the common channel frames for the base stations being approximately constant in time, except possibly for small fluctuations around a nominal value. In this configuration, the system frame number (SFN) values for the common channel frames at any given time instance are the same for all three base stations.

FIG. 2B is a diagram illustrating a second system configuration (S2) in which a number of base stations are also operated synchronously with a time-aligned frame start but non-aligned frame numbering. In this configuration, the common channel frames from the base stations start at approximately the same time. However, the SFN values for the common channel frames at any given time instance may not be the same for all base stations.

Figure 2C:
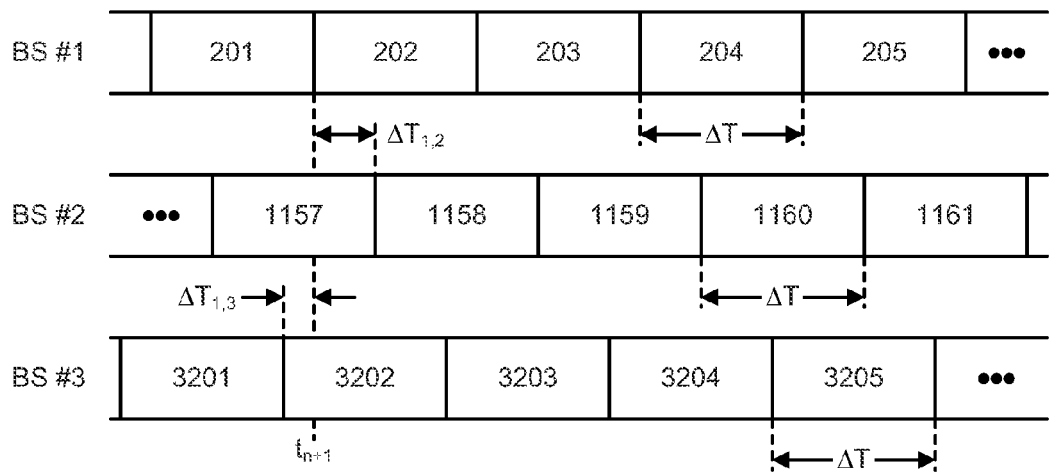

FIG. 2C is a diagram illustrating a third system configuration (S3) in which a number of base stations are operated synchronously but with a non-aligned frame start and numbering. In this configuration, the common channel frames from the base stations do not start at the same time but are instead offset from one another by some (constant) values. Consequently, the SFN values for the common channel frames at any given time instance may not be the same for all base stations.

As used herein, a "synchronous configuration" includes any configuration in which the system has knowledge of the relative timing difference between the base stations to some desired degree of accuracy. The base stations may or may not be operated based on different unsynchronized clocks. However, if the system has some means to determine the relative timing difference between the base stations (e.g., through explicit measurements, or implicitly if it is known a priori that the base stations are synchronized), then the base stations may be deemed to be operated in the synchronous configuration.

Figure 2D:
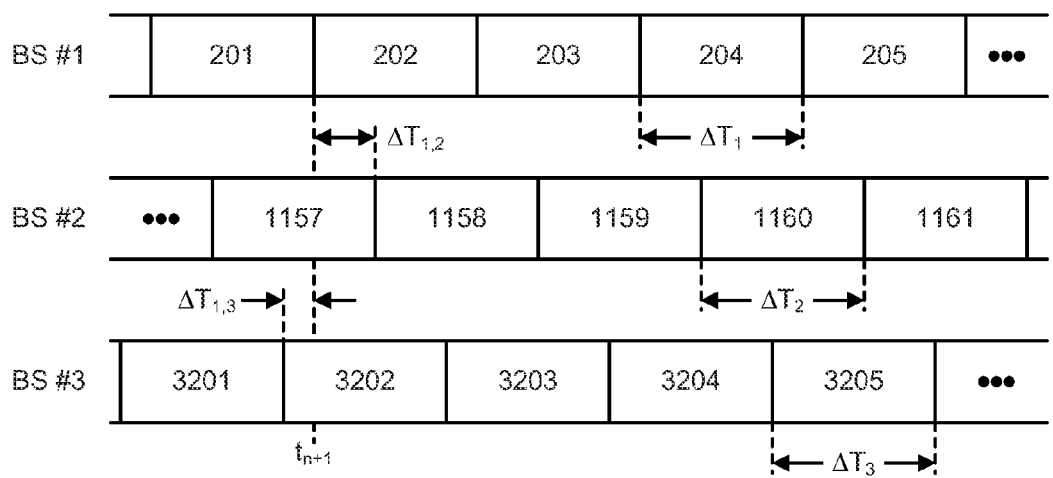

FIG. 2D is a diagram illustrating a fourth system configuration (A1) in which a number of base stations are operated asynchronously. In this configuration, the base stations are not synchronized and the time relationship between the common channel frames for these base stations drifts over time. The common channels for each base station are typically aligned to each other, but not to those of the other base stations. The long-term average value of this drift may be zero or may be some non-zero value (i.e., the time difference between the base stations may continually increase or decrease). Because of the asynchronous operation, the common channels for these base stations are not likely to start at the same time (unless by coincidence). Moreover, the SFN values for the common channel frames at any given time instance are not likely to be the same for all base stations.

For soft handover in an asynchronous configuration such as that shown in FIG. 2D, the transmissions from multiple base stations are not synchronized, and the user-specific radio frames for a given terminal are likely to be transmitted by the base stations starting at different times (unless they are time compensated). Moreover, the propagation time of the transmission from each base station may be unique and is dependent on the distance between that base station and the terminal. Thus, the user-specific transmissions from different base stations are likely to be received by the terminal at different times (again, unless time compensated). (For the W-CDMA system, only the user-specific data transmissions are time compensated, but not the transmissions on the common channels.)

For the asynchronous configuration shown in FIG. 2D, the radio frames (1158, 1159, . . . ) received from base station 2 are offset in time by $\Delta T_{1,2}$ from the radio frames (202, 203, . . . ) received from base station 1, where $\Delta T_{1,2}$ can be a positive or negative value depending on whether the start of a designated frame from base station 2 is earlier or later than the start of another designated frame from base station 1. Similarly, the radio frames (3202, 3203, . . . ) received from base station 3 are offset by $\Delta T_{1,3}$ from the radio frames received from base station 1. The time differences or offsets, $\Delta T_{1,2}$ and $\Delta T_{1,3}$, are not defined by a particular relationship and may further vary from frame to frame. In general, for an asynchronous system configuration, the time difference $\Delta T_{X,Y}$ can take on any (random) values since (1) the base stations transmit asynchronously without a defined timing relationship and (2) the propagation times from the base stations to the terminal are variable and dependent in part on the terminal's position.

For some functions, it is useful or necessary to know the arrival times of the (common) transmissions from multiple base stations. The signal arrival times, as measured at the terminal, can then be used to compute the time differences between the transmissions received from various base stations. The time differences can then be used for various functions, such as for hard and soft handovers.

Soft handover processing entails evaluating one or more new candidate base stations for inclusion in the active set of a terminal. To facilitate soft handover in a W-CDMA system (i.e., a UMTS Radio Access Network (UTRAN) in W-CDMA terminology), the terminal (i.e., a User Equipment (UE) in W-CDMA terminology) reports to the communication system a time difference measurement and a signal quality measurement for each new candidate base station to be considered for inclusion in the terminals active set. The signal quality measurement may be used to decide whether or not to include the candidate base station in the terminal's active set. The time difference measurement may be used to adjust the timing of the data transmission sent to the terminal, as described below.

Hard handover processing entails replacing the current active set for a terminal with a new potentially disjoint active set on the same or different frequency. The system determines the relative time difference between the common and dedicated frames for all members of the new active set, even if the new active set is composed of a single base station. The reference base station for the new active set is typically indicated in a message sent to the terminal for hard handover.

The time difference is typically measured between a new candidate base station and the reference base station. The reference base station is a specific base station in the active set that is designated as such by the terminal or by the system. If the terminal is not already in active communication with the system (i.e., not already assigned dedicated channels and the active set is null), then the reference base station is the one on which the terminal is currently "camped," i.e., the base station from which the terminal is receiving its broadcast channels and toward which it is sending the measurements required before the setup of dedicated channels, which is usually done directly in handover.

For each new candidate base station selected for inclusion in the terminal's active set (whether for hard or soft handover), the system can instruct the new base station to compensate its timing for the terminal such that the radio frames transmitted by this new base station on a dedicated physical channel (DPCH) will reach the terminal at approximately the same time as the radio frames transmitted by other base stations in the terminal's active set (i.e., the current active base stations) on their respective DPCHs. In essence, the timing of the user-specific radio frames on the DPCH from each active base station for the terminal is shifted relative to the timing of radio frames on that base station's common channels to achieve similar arrival times for the radio frames on the DPCHs for all active base stations transmitting to the terminal.

The timing compensation performed at the active base stations approximately aligns the start of the radio frames from these base stations, as received at the terminal, to a particular time window (which may span, e.g., a few chips). With the timing compensation, the user-specific radio frames on the DPCHs (i.e., dedicated channel frames) from all active base stations are approximately aligned even though their common channel frames may be received at different times due to different transmit times and different propagation delays. In this way, the terminal can process multiple signal instances received from all transmitting base stations within a smaller defined window (e.g., 256 chips). If the time difference between the downlink DPCH and the downlink common channels for a particular candidate base station cannot be determined, then, in accordance with the current W-CDMA standard, it may not be possible for the system to add the candidate base station to the terminal's active set.

The time difference between each candidate base station and the reference base station for handover is specific to the terminal. Typically, a coarse time difference measurement (e.g., one chip or worse resolution) is adequate for handover.

The time difference between two base stations may be measured or estimated based on various types of transmissions from these base stations. The W-CDMA standard defines a (logical) broadcast control channel (BCCH) that is mapped to a (transport) broadcast channel (BCH), which is further mapped to a (physical) primary common control channel (P-CCPCH). The broadcast control channel is a higher layer channel that is used to broadcast messages to the terminals in the system. The broadcast messages are encoded in 20 milli-second (msec or ms) transport blocks, which are then transmitted in (10 ms) radio frames on the P-CCPCH. In W-CDMA, 20 ms is the interleaver size, which is also referred to as the Transmission Time Interval (TTI). Since a transport block is 20 ms long, the number included in each radio frame is not the real SFN value, but derived from an SFNPrime. i.e., SFN=SFNprime for the first 10 ms frame of the 20 ms TTI and SFN=SFNprime+1 for the last 10 ms frame of the 20 ms TTI. The start of the transmitted radio frames may be determined by processing the SCH and/or CPICH and these frame start times may then be used as the signal arrival times for the base stations. The broadcast channel on the P-CCPCH can further be processed (e.g., demodulated and processed) to recover the system frame numbers of the transmitted common channel frames. Typically, the time difference between two base stations is determined based on the signal arrival times of the earliest multipaths for these base stations.

In accordance with the W-CDMA standard, the time difference between two base stations may be measured by a terminal and reported to the system via various types of messages. The W-CDMA standard defines an SFN-SFN measurement, which is indicative of the time offset $\Delta T_{X,Y}$ in FIG. 2D. This measurement can be made by the terminal and sent to the system so that the transmission from a new base station may be compensated as part of the handover process. Several types of SFN-SFN measurement are supported by the W-CDMA standard, as briefly described below.

An "SFN-SFN observed time difference type 1 measurement" (or more simply, "SFN-SFN type 1 measurement") may be used to report the observed time difference between a new candidate base station and the reference base station. This measurement includes both frame-level timing and chip-level timing, which may be obtained by processing the broadcast channel and the P-CCPCH, respectively. The broadcast channel and P-CCPCH are described in further detail in Document Nos. 3GPP TS 25.133, 25.305, and 25.331, all of which are publicly available from the 3GPP organization.

To perform an SFN-SFN type 1 measurement for a new candidate base station, the terminal initially processes the SCH and/or CPICH to recover the chip-level time difference between the candidate base station and the reference base station. This chip-level time difference, which is indicative of the difference between the start of the common channel frames from these two base stations, may be determined based on the timing of the pseudo-noise (PN) sequences used to descramble the CPICH. The chip-level time difference has a range of [0 . . . 38,399] chips, which is one full 10 msec radio frame.

To obtain the frame-level timing, the terminal processes (e.g., demodulates and decodes) the broadcast channels from the candidate base stations (and also the reference base station, if it is not already known to the terminal) to retrieve the frame number for the common channel frames at a particular time instance. For each base station to be reported, the terminal processes 20 ms or more of the broadcast control channel (BCCH) since the TTI that includes the SFN information (SFNPrime) is 20 ms long. The terminal then determines the difference in the system frame numbers for these base stations.

The observed SFN and chip differences are then combined by taking the modulo 256 of the SFN difference, scaling the modulo result by 38,400, and adding the scaled value to the chip-level timing difference, where 38,400 represents the number of chips within a 10 ms radio frame. The combined result is a value that falls within a range of [0 ... 256•38,400−1] chips, where 256 represents the maximum value for the SFN difference after the modulo 256 operation and is in units of frames. The time difference between the candidate and reference base stations may thus be reported with a resolution of one chip. The SFN-SFN type 1 measurement is described in further detail in Document Nos. 3GPP TS 25.133 and 25.331 (Section 10.3.7.63).

An "SFN-SFN observed time difference type 2 measurement" (or more simply, "SFN-SFN type 2 measurement") can also be used to report the observed time difference between a candidate base station and the reference base station, and includes only chip-level timing. The terminal determines the difference in the chip-level timing between these base stations to a finer resolution (e.g., between ½ chip to 1/16 chip resolution). The observed chip-level time difference is then represented by a value that falls within a range of [−1280 ... 1280] chips. For the SFN-SFN type 2 measurement, the terminal does not need to determine the system frame number for the candidate base station.

To add a candidate base station to the active set of a terminal for handover, the observed time difference between the common channel frames for the candidate and reference base stations may be measured by the terminal and reported to the system. This observed time difference can be provided to the system via an information element "SFN-SFN type 1" that is included in a Measurement Report message. In order to assist the handover process, the full range of the SFN-SFN type 1 measurement is provided by the terminal in the report message. This full range includes the frame-level time difference plus the chip-level time difference.

The use of the SFN-SFN type 1 measurement to report the time difference for a candidate base station for handover may be less than optimal for various situations, especially for system configurations in which the frame-level timing is not needed. For the system configurations S1, S2, and S3 shown in FIGS. 2A, 2B, and 2C, the base stations are synchronous and the frame-level timing for the base stations is typically known by the system. For these system configurations, it is only necessary to report the chip-level timing to the system. For system configuration S1, the time difference is primarily due to the different distances from the terminal to the base stations and the small time inaccuracies of the base station synchronization.

However, for the SFN-SFN type 1 measurement as currently defined by the W-CDMA standard, both the frame-level timing and the chip-level timing need to be determined and reported by the terminal. To determine the frame-level timing, the common radio frame on the broadcast channel of the candidate base station needs to be demodulated, decoded, and recovered by the terminal, and this may be undesirable for several reasons. First, if the broadcast channel of a candidate base station needs to be recovered for the base station to be reported and considered for possible handover, then the handover region may be limited to only the region where the broadcast channel can be recovered, which may be only a portion of the total region covered by the candidate base station. Second, the processing of the broadcast channel results in additional delays (which may be 20 ms or more for each measured base station) that can prolong the handover process and degrade performance. Thus, it is undesirable to use the SFN-SFN type 1 measurement (as currently defined by the W-CDMA standard) to report the time difference for a candidate base station if the frame-level timing is not required.

In system configurations where the frame-level timing is not required by the system, only the chip-level timing needs to be reported for the time difference. This chip offset may be reported using the SFN-SFN type 2 measurement defined by the W-CDMA standard.

However, the use of the SFN-SFN type 2 measurement to report the chip-level liming for handover may also be undesirable for various situations. For the SFN-SFN type 2 measurement, the specified resolution is 1/16 of a chip and the accuracy requirements range from ½ chip (as currently defined by the W-CDMA standard) to 1/16 chip or possibly better (for future revisions of the W-CDMA standard). To obtain more accurate sub-chip resolution, more complicated and/or prolonged search and acquisition procedures may be required.

Moreover, the SFN-SFN type 2 measurement is originally intended to be used for position determination, and its use for reporting time difference for handover functions may result in some undesirable consequences. According to the current W-CDMA standard, the SFN-SFN type 2 measurement is only reported inside OTDOA messages. (OTDOA denotes "observed time difference of arrival" and is a position location technique used in W-CDMA. E-OTD denotes "enhanced observed time difference" and is a similar position location technique used in cdma2000.) Thus, some OTDOA-related messages may need to be exchanged as a result of requesting the terminal to send the SFN-SFN type 2 measurement. Moreover, the SFN-SFN type 2 measurement may be supported by only terminals that support OTDOA and not by all terminals deployed in the field. Thus, the SFN-SFN type 2 measurement cannot be relied upon for reporting chip-level timing for handover since some terminals may not support the measurement.

1. Time-Alignment Schemes

Various schemes are provided herein to time-align data transmissions from multiple base stations to a terminal. To achieve the time-alignment, the time differences between the arrival times of the downlink signals transmitted from the base stations, as observed at the terminal, are determined and provided to the system (e.g., the UTRAN). The system then uses the timing information to adjust the timing at the base stations such that the user-specific radio frames transmitted from the base stations arrive at the terminal within a particular time window. Several schemes are described in detail below. Other schemes may also be implemented and are within the scope of the invention.

In a first time-alignment scheme, the time difference between two base stations is partitioned into two pans, and only the required part(s) are reported. For the W-CDMA system, the SFN-SFN type 1 measurement can be partitioned into the frame-level timing and the chip-level timing, as described above. Whenever requested to perform and report time difference measurements for a list of one or more base stations, the terminal measures and reports the chip-level timing for each base station in the list. Additionally, the terminal also measures and reports the frame-level timing and includes this information in the SFN-SFN type 1 measurement only if required (e.g., as directed by the system). Otherwise, if the frame-level timing is not required, the terminal can set the frame-level part to a predetermined value. The predetermined value may be a known fixed value (e.g., zero), any arbitrary value selected by the terminal and which may be ignored by the system, a value for the frame-level timing derived from or known in advance by various means (e.g., previous measurements of the same base station, transmissions from the system, and so on), or some other value.

As shown in FIGS. 2A through 2D, the system can be operated based on one or more system configurations. The system may also be operated such that some of the base stations are operated synchronously while others are operated asynchronously. For synchronous configurations such as those shown in FIGS. 2A through 2C, the frame-level timing is typically already known by the system and does not need to be reported by the terminal when requested to perform and report time difference measurements. For synchronous base stations having fixed frame-level timing that is already known by the system, the frame-level timing need not be measured by the terminal.

In an embodiment, information may be provided to specifically identify the base stations for which frame-level timing is not required. For simplicity, these base stations are referred to as "synchronous base stations" regardless of whether or not they are actually operated synchronously. All other base stations for which frame-level timing is required are referred to as "asynchronous base stations" regardless of whether or not they are actually operated asynchronously. Using this information, frame-level time difference measurements are hot made by the terminal when not required, and the selective omission of these measurements can provide various benefits described below.

In one embodiment, the identities of the synchronous base stations are provided by the system to the terminal via user-specific messages, for the W-CDMA system, a Measurement Control message is sent to the terminal each time a time difference measurement is to be performed and reported. (A set of "default" measurements is defined in the System Information message, sent on common channels, and is used by default unless a measurement control message is received.) The Measurement Control message includes a list of base stations for which time difference measurements are requested. This list may include the current active base stations and/or the neighbor base stations, which are potential candidate base stations for handover. For each base station in the list, the Measurement Control message may be configured to include an indication of whether or not frame-level timing is required for the base station. In one specific implementation, this indicator is the "Read SFN Indicator" defined by the W-CDMA standard, which may be set to TRUE if frame-level timing is required and set to False otherwise. By recovering the Read SFN Indicator for each base station in the list, the terminal is able to determine whether or not frame-level timing is required for the base station.

In another embodiment, the identities of the synchronous base stations are provided by the system to the terminal via an Information Element (IE) defined by the W-CDMA standard (Document No. 3GPP TS 25.331, Section 10.3.7.106, entitled "UE Positioning OTDOA Neighbour Cell Info"). The Information Element provides approximate cell timing as well as the cell locations and fine cell timing. Specifically, the Information Element provides the SFN-SFN of the neighbor cell with a resolution of $1/16$ of a chip and a range of [0 . . . 38,399] chips, and further provides the SFN-SFN drift. In general, the Information Element may be used by the terminal to reduce the search space and, in particular, to estimate which base stations are synchronized. In accordance with the current W-CDMA standard, the Information Element is sent vie the Measurement Control message to OTDOA-capable terminals when operating in a dedicated mode, or via the System Information message to all terminals in the cell, and is used to assist the terminals to perform position location. In an embodiment, this information may be provided and used to narrow the search space of neighbor cell signals for position location measurements as well as for measurements used for hard and soft handovers.

In yet another embodiment, the identities of synchronous base stations are provided by the system via broadcast messages transmitted on a common channel (e.g., the broadcast channel). The broadcast messages can include a list of synchronous base stations for which it is not necessary to report the frame-level timing. Alternatively, the broadcast messages can include a list of asynchronous base stations for which it is necessary to report the frame-level timing. In yet another embodiment, the identities of the synchronous and/or asynchronous base stations are transmitted via a dedicated channel or some other channel to the terminal.

In yet another embodiment, the identities of the synchronous and/or asynchronous base stations are provided to the terminal a priori, prior to the request for the time difference measurements. For example, this information may be provided during a call set-up or may be stored in the terminal via some previous communication or transaction.

Upon receiving the identities of the synchronous and/or asynchronous base stations, the terminal knows that there may be no need to recover the SFN values for some or all of the base stations. For each base station for which frame-level timing is not required, the terminal can measure only the chip-level time difference between that base station and the reference base station with respect to a common frame boundary and report only the chip-level timing. The frame-level timing can be set to the predetermined value. If the predetermined value is zero, then the reported value for the SFN-SFN type 1 measurement would fall within a reduced range of [0 . . . 38,399] chips, or one frame.

Figure 3A:
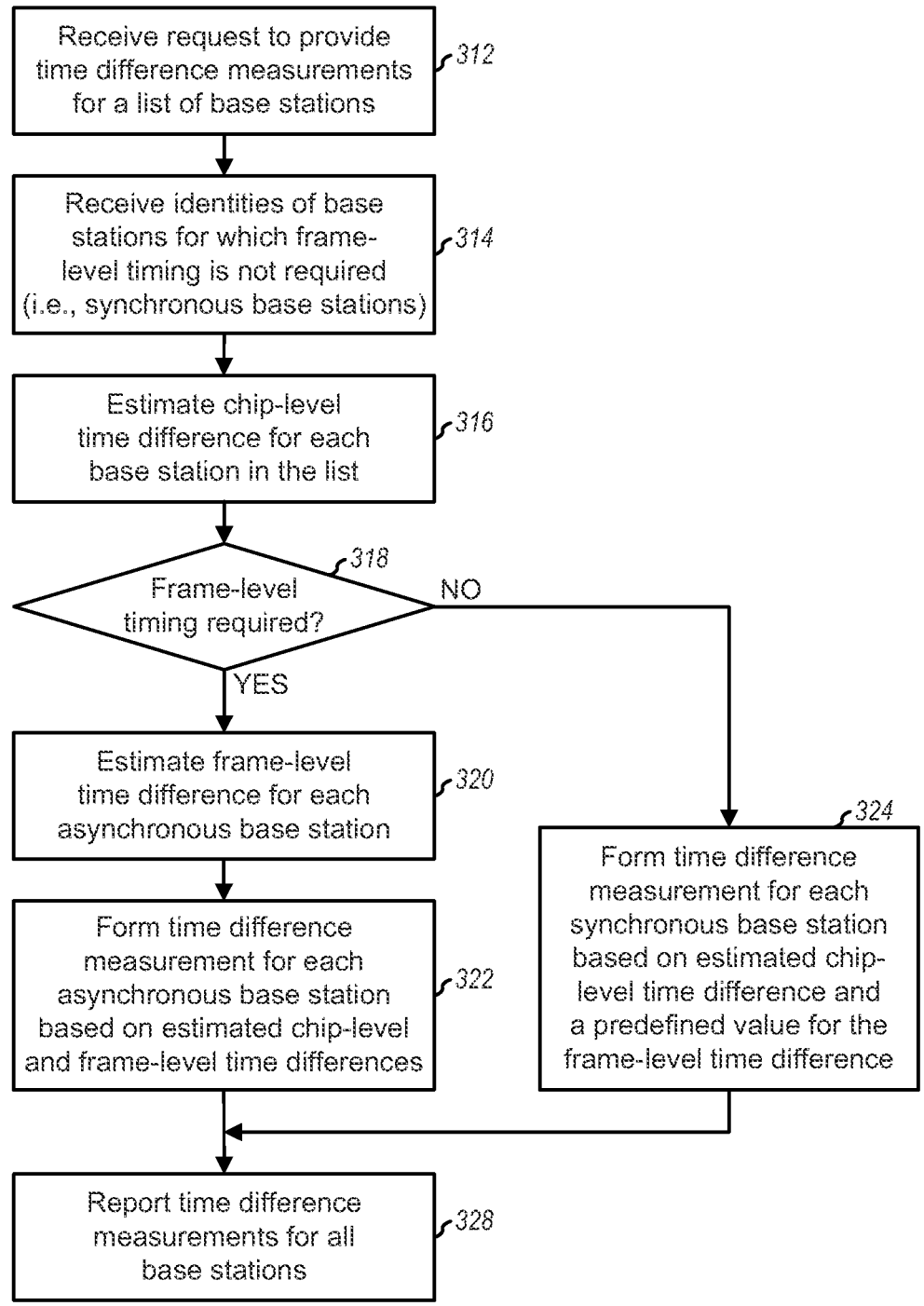
FIGS. 3A through 3C are flow diagrams of various embodiments of processes to determine time differences for multiple base stations.

FIG. 3A is a flow diagram of an embodiment of a process to measure and report time difference measurements. This process implements the first time-alignment scheme described above. Initially, the terminal receives a request to provide time difference measurements for a list of base stations, at block 312. This request may be sent by the system for a particular function, such as for soft and hard handovers, position determination, and so on. This request may also be generated internally by the terminal, for example, based on the occurrence of a particular event, the fulfillment of a particular condition, periodically as determined by a timer, and so on.

In an embodiment, the request specifically identifies the base stations for which the time difference measurements are desired. In an alternative embodiment, the terminal determines the time difference for a list of base stations identified as being received by the terminal. For this embodiment, a base station may be deemed as being received by the terminal if it meets one or more requirements, such as the received signal quality being greater than or equal to a particular threshold. The received base stations would then be included in the list of base stations for which time difference measurements are reported.

The terminal also receives the identities of base stations for which frame-level timing is not required, at block 314. These base stations may simply be denoted as synchronous base stations, and all other base stations may be denoted as asynchronous base stations. The list of base stations for which time difference measurements are desired may include any number of (zero or more) synchronous base stations and any number of (zero or more) asynchronous base stations. The information identifying the synchronous and/or asynchronous base stations may be provided to the terminal via various means such as by being (1) sent specifically to the terminal via the request for time difference measurements, (2) broadcast to the terminal via signaling on the broadcast channel, (3) provided to the terminal during a call set-up, (4) stored within the terminal by a previous action, or (5) made available to the terminal via some other means.

In response to the request, the terminal estimates the chip-level time difference for each base station in the list, at block 316. The chip-level time difference may be determined for each base station relative to the timing of the reference base station, which is a specific base station in the terminal's active set and is known to both the system and the terminal.

For each base station in the list, a determination is then made whether or not frame-level timing is required for the base station, at block 318. This can be performed by checking whether the base station is synchronous or asynchronous. If frame-level timing is required, then the terminal estimates the frame-level time difference for the base station, at block 320. This may be performed by demodulating and decoding a common channel (e.g., the broadcast channel) from the base station to retrieve the system frame number, as described above. For each asynchronous base station, a time difference measurement is then formed based on the estimated chip-level and frame-level time differences, at block 322. For each synchronous base station for which frame-level timing is not required, a time difference measurement is formed for the base station based on the estimated chip-level time difference and a predetermined value (e.g., zero) for the frame-level time difference, at block 324.

The time difference measurements for all base stations in the list (i.e., both synchronous and asynchronous base stations) are then reported to the system, at block 328. In an embodiment, the time difference measurements for all base stations are encapsulated into the information element "SFN-SFN type 1" that is included in the Measurement Report message, which is then sent to the system. The system receives the Measurement Report message and adjusts the timing of the data transmission from each selected base station to the terminal based on the time difference estimated for the selected base station. The process then terminates.

The first time-alignment scheme may be used for all configurations in which the frame-level timing is already known by the system and does not need to be measured and reported. This scheme is particularly well suited for synchronous system configurations such as those shown in FIGS. 2A through 2C. In system configurations S2 and S3, the actual value of the frame-level time difference may be a non-zero value. However, the terminal reports the predetermined value (e.g., zero) for the frame-level part of the SFN-SFN type 1 measurement. The possibly erroneous reported value for the frame-level part does not affect the ability of the system to add new candidate base stations to the terminal's active set since the actual frame difference (if it is a non-zero value) is a constant value that is already known by the system.

The first time-alignment scheme provides numerous advantages. First, the terminal does not need to demodulate and decode the broadcast channel to recover the system frame number of a candidate base station if this information is not required. This ameliorates the disadvantages noted above (i.e., smaller handover region and additional processing delays). Second, by setting the frame-level part to the predetermined value, the length of the information element "SFN-SFN type 1" in the Measurement Report message is not affected by whether or not "valid" frame-level information is included in the message.

The first time-alignment scheme uses the information element "SFN-SFN type 1" in the Measurement Report message, as defined by the W-CDMA standard, and allows the terminal to report only the chip-level time difference if the frame-level timing is already known to the system. The system has the capability to broadcast such information, as currently defined by the W-CDMA standard. With this information, the terminal would not need to process and recover the broadcast channel to recover the SFN since the terminal can set the frame-level part for the SFN-SFN type 1 measurement to the predetermined value. However, the terminal would still send the SFN-SFN type 1 measurement as a number encoded with 24 bits (since the maximum range of SFN-SFN type 1 measurement is [0 . . . 9,830,399] chips), which would however have a reduced range of [0 . . . 38399] chips (the eight most significant bits are set to zero).

In a second time-alignment scheme, the time difference between two base stations is determined by a terminal based on partial decoding of some of the base stations received by the terminal. For this scheme, the terminal initially processes the downlink signals transmitted from the base stations to detect their presence. The terminal further decodes the primary common control channel (P-CCPCH) for a number of base stations, which may be selected based on a particular criterion. For example, the base stations whose received signal strengths are above a particular threshold (i.e., strong enough to be decoded) may be selected for decoding, starting with the strongest received base station. In an embodiment, if two or more decoded base stations have the same SFN value at a particular time instance, then a synchronous system configuration with time-aligned frame start (i.e., configuration S1 shown in FIG. 2A) can be deduced. The terminal can then hypothesize that the other (weaker received and undecoded) base stations also have the same SFN value, and can report the predetermined value for the frame-level part of the SFN-SFN type 1 measurements for these "hypothesized" base stations.

Figure 3B:
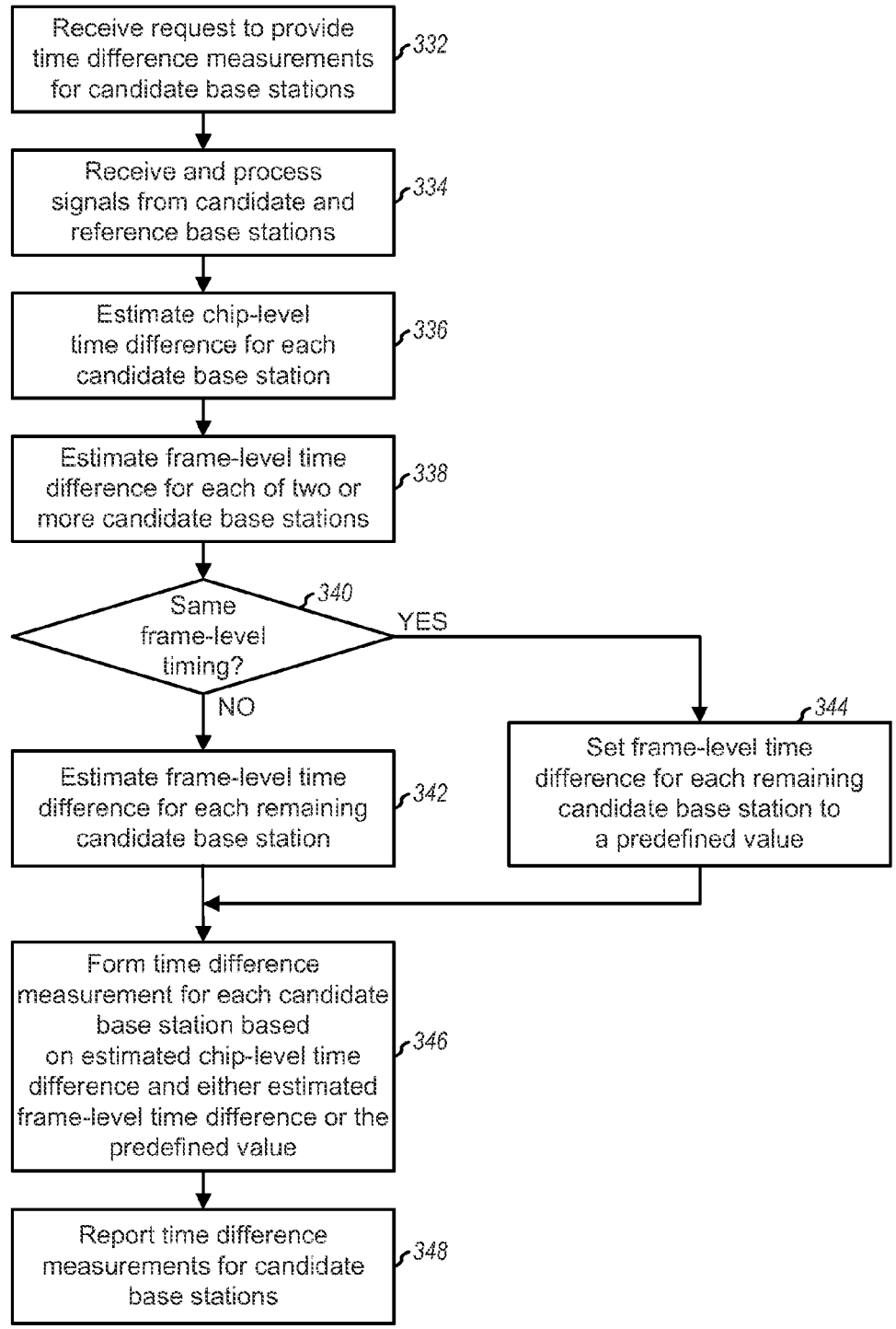

FIG. 3B is a flow diagram of another embodiment of a process to measure and report time difference measurements. This process implements the second time-alignment scheme. Initially, the terminal receives a request to provide time difference measurements for a number of candidate base stations, at block 332. The terminal then receives and processes the downlink signals from the candidate and reference base stations, at block 334.

For each candidate base station, the terminal estimates the chip-level time difference, e.g., in a manner described above, at block 336. The terminal also estimates the frame-level time differences for two or more candidate base stations, at block 338. A determination is then made whether or not the estimated frame-level timing is the same for the two or more candidate base stations, at block 340. If the frame-level timing is the same, then the terminal assumes a synchronous system configuration with time-aligned frame start and consequently sets the frame-level time difference for each remaining candidate base station to the predetermined value, at block 344. Otherwise, if the frame-level timing is not the same at block 340, the frame-level time difference for each remaining candidate base station is estimated, at block 342.

For each candidate base station, a time difference measurement is then formed based on the estimated chip-level time difference and either the estimated frame-level time difference or the predetermined value, at block 346. The time difference measurements for the candidate base stations are then reported to the system, at block 348. The system receives the reported time differences and adjusts the timing of the data transmission from each selected base station to the terminal based on the time difference estimated for the selected base station. The process then terminates.

The second time-alignment scheme can provide sufficiently accurate time difference measurements for system configuration S1 shown in FIG. 2A, which is more likely to be deployed by the network operator than the other system configurations shown in FIGS. 2B through 2D.

Since there is no guarantee that all base stations are synchronized if some of them are synchronized, and also for instances in which the same SFN value is coincidentally obtained at a particular time instance, a mechanism may be provided to bypass this scheme and implement some other scheme to provide the required frame-level timing. For example, a message may be sent to the terminal if the reported measurements do not match a profile for the reported base stations. Alternatively, the terminal may determine later that it is not able to decode the radio frames from a hypothesized base station because the timing has been adjusted to the wrong value. In any case, upon receiving an indication that a previously reported time difference measurement is erroneous because of an incorrect hypothesis, the terminal may perform a complete SFN-SFN type 1 measurement and decode the P-CCPCH for the hypothesized base station to obtain the actual frame-level timing.

In a third time-alignment scheme, the timing for a terminal is ascertained by the base stations based on an uplink transmission from the terminal. The recovered timing information may then be used to adjust the timing of the downlink transmissions to the terminal.

In an embodiment, the base stations that are not in the terminal's active set but are in the neighborhood of the terminal (i.e., neighbor base stations) may be instructed by the system to measure the uplink transmission from the terminal (e.g., a transmission on the uplink dedicated physical channel (DPCH)). If the neighbor base stations are able to receive the uplink transmission with sufficient strength, then they can accurately estimate the arrival time of the uplink transmission. Based on the estimated signal arrival times from the neighbor base stations and a priori knowledge of the time relation between common channel frames among the various active and neighbor base stations, the system can determine the proper timing for each neighbor base station that may be added to the terminal's active set such that the downlink transmission from the added base station is properly time-aligned at the terminal.

The third time-alignment scheme may be implemented based solely on measurements performed at the neighbor base stations. Each neighbor base station may be designed to include receiver processing units that search for and process the uplink transmissions from the terminals located in the neighboring cells. This scheme may be used for synchronous and asynchronous system configurations.

Figure 3C:
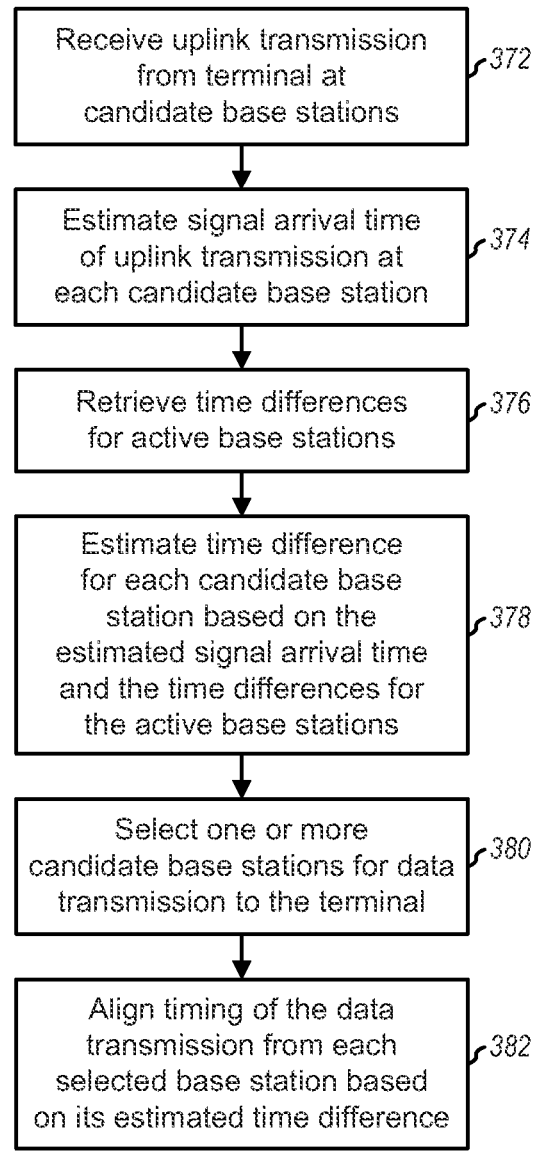

FIG. 3C is a flow diagram of an embodiment of a process to determine the timing for a terminal based on an uplink transmission. This process implements the third time-alignment scheme. Initially, the candidate base stations receive the uplink transmission from the terminal, at block 372, and each candidate base station estimates the signal arrival time of the received uplink transmission, at block 374. The system then retrieves the time differences for active base stations (i.e., base stations in the active set of the terminal), at block 376. The difference between common channel frames may be known in the system for all the synchronous system configurations S1, S2, and S3.

The system then estimates the time difference for each candidate base station based on the signal arrival time estimated by the candidate base station and the time differences for the active base stations, at block 378. One or more candidate base stations may thereafter be selected for data transmission to the terminal, at block 380. In that case, the timing of the data transmission from each selected base station to the terminal is adjusted based on the time difference estimated for the selected base station, at block 382. The process then terminates.

In a fourth time-alignment scheme, the time difference between two base stations is ascertained by the system based on a priori knowledge of the layout and sizes of the cells in the system. If the coverage areas of the base stations are sufficiently small, then the time uncertainty due to signal propagation delays is also small (e.g., a few chips or less). For the W-CDMA system, the time difference between a common channel frame and a dedicated channel frame may be determined (e.g., for the reference base station), and all other base stations may be associated with the same time difference between their common and dedicated channel frames.

The above-described techniques for time-aligning transmission provide various advantages. First, when a terminal is handed over from a first, base station to a second base station, the measurement of the SFN-SFN time difference between these base stations along with the round trip delay measurements (which may be performed by the first base station) allow the second base station to determine where to search for the terminal's uplink transmission. This mechanism is described by Chuck Wheatley in a paper entitled "Self-Synchronizing a CDMA Cellular Network," pages 320-328. Microwave Journal, May 1999. Second, the SFN-SFN time difference measurement may be used by the second base station to time-align its downlink transmission so that it is received by the terminal close in time to the downlink transmission from the first base station. Other benefits may also be realized by the use of the techniques described herein.

The techniques described herein may also be applied to other communication systems in which the time difference may be partitioned into two or more parts having different resolutions and/or pertaining to different measurement types. In the above description, the time difference is partitioned into the chip-level and frame-level pans. For some other systems, the time difference may be partitioned into a fine-resolution part and a coarse-resolution part. The time difference may also be partitioned in some other manner for some other systems. In any case, the measurement may be performed for only the required part or parts, and a predetermined or default value may be used for each non-required part.

2. Virtual Synchronization

As noted above, a W-CDMA or UMTS system may be deployed with synchronous or asynchronous base stations. It is well known that synchronization of the base stations may provide significant advantages for certain system operations. For example, if the base stations 104 are synchronized and their timing is known, then a terminal 106 may search for the signal transmitted by each base station 104 in a smaller amount of time than if the base stations 104 are not synchronized. This shorter search time provides a two-fold benefit on the performance of the terminal 106. First, during a call, the terminal 106 may search quicker for candidate base stations 104 to which it may be handed over. Second, if the terminal 106 is not continuously receiving and processing downlink signals (e.g., while it is in an idle mode), then the terminal 106 may save power if it can search for all neighbor base stations 104 in a smaller search window. Power consumption would be reduced and both the batten-life and standby time for the terminal 106 may be extended.

Conventionally, synchronization of the base stations in a CDMA system is achieved by incorporating a GPS receiver in each base station. The GPS receiver is used to provide an accurate time reference, which is derived from the GPS system. All base stations would then lock their timing to the accurate time reference from the same GPS time source.

For a W-CDMA system, if each base station 104 can extract and lock to the accurate time reference provided by a GPS receiver, then the synchronization among base stations 104 in the system 100 may be achieved with a simple one-time provisioning of each base station 104. For example, each base station 104 may synchronize the beginning of its SFN numbering with a deterministic and periodic occurrence of a particular event on GPS time. In particular, since the SFN rolls over every 4096 frames (i.e., the SFN ranges from 0 through 4095) and since each radio frame is 10 ms long, the SFN will roll over every 40.96 seconds. The GPS time may correspondingly be divided into 40.96 second time intervals. Synchronization may then be achieved by associating, for each base station, the start of the BCCH frame with SFN=0 to a specific phase of the GPS time interval. The difference between the phases of the base stations 104 in the system 100, and, thus the time offsets between these base stations 104, would then be constant over time since they are all referenced to the same GPS time source that is available worldwide.

The synchronous requirement may hinder or restrict the deployment of a CDMA system. Moreover, a system may already be deployed without the capability to operate synchronously. For these and other reasons, other techniques may be needed to obtain the benefits of a synchronous system even if the base stations 104 are operated asynchronously.

Techniques are provided herein to obtain the benefits of a synchronous system by maintaining "virtual" synchronization among base stations 104 that are not actually synchronized to an external time reference system, such as the GPS time system. The virtual synchronization is achieved by (1) ascertaining the time relationship between the base stations 104 to be maintained virtually synchronized and (2) providing this time relationship to the terminals 106 for their use.

Figure 4:
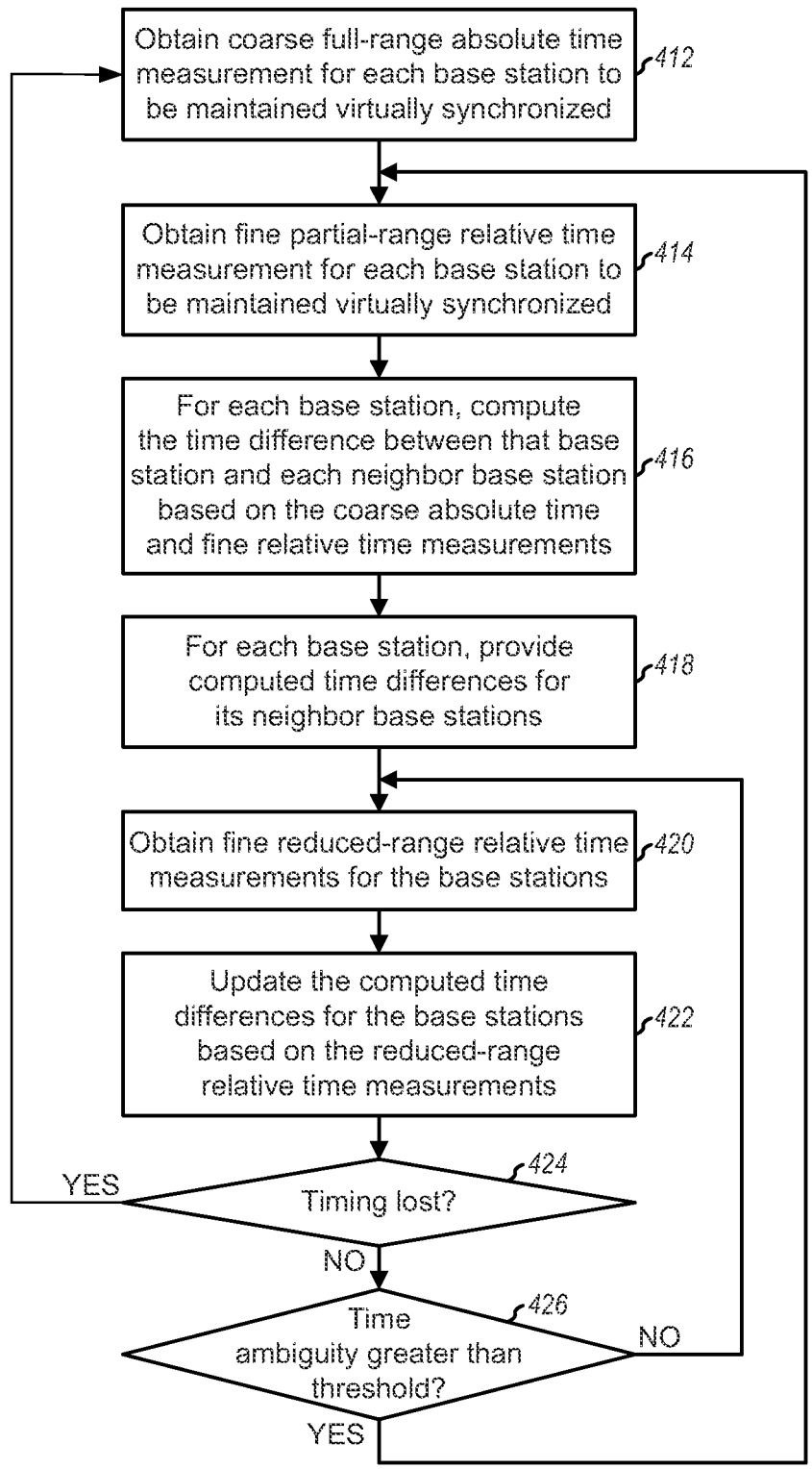
FIG. 4 shows a flow diagram for achieving virtual synchronization for base stations in an asynchronous communication system.

FIG. 4 shows a flow diagram of an embodiment for achieving virtual synchronization for base stations 104 in an asynchronous communication system. The flow diagram in FIG. 4 may be performed, for example, by a radio network controller (RNC) 110 for the base stations 104 under its control.

Initially, a coarse full-range absolute time measurement is obtained for each base station 104 to be maintained virtually synchronized (block 412). For a W-CDMA system, the coarse absolute time for a giver, base station 104 may be indicated by the SFN value used by the base station 104 for its current radio frame. The absolute time measurement may be very coarse because the SFN value obtained from the base station 104 may have a large uncertainty (e.g., tens of frames, or hundreds of milli-seconds) due to reporting and transmission delays. However, the reported SFN value has a full range of [0 ... 4095] frames (i.e., the reported SFN value is a full 12-bit value).

A fine partial-range relative time measurement is also obtained for each base station 104 to be maintained virtually synchronized (block 414). Each base station 104 to be maintained virtually synchronized is included in at least one relative time measurement. A minimum of N−1 relative time measurements are needed for N base stations 104, but more than N−1 measurements may also be used for improved accuracy.

For a W-CDMA system, the relative time for a given base station 104 may be measured by a terminal 106 as the time difference between that base station 104 and a reference base station 104. The relative time measurement for each base station 104 may be sent to the system (e.g., the RNC 110) via the information element "SFN-SFN type 1" included in the Measurement Report message. The reported relative time measurement for each base station 104 would include (1) the frame-level time difference, which has a partial range of [0 ... 255] frames (i.e., the reported SFN value is an incomplete/partial 8-bit value) and (2) the chip-level time difference, which has an accuracy or ambiguity of a few chips and a range of [0 ... 38,399] chips or one frame. Since the frame-level time difference does not cover the full range for the SFN (i.e., the 4 MSBs for the SFN-SFN difference are not reported), there is ambiguity in the relative time measurement reported by the terminal 106.

For each base station 104 to be maintained virtually synchronized, the fine full-range time difference between a particular base station 104 and each neighbor base station 104 is computed based on the coarse absolute time and fine relative time measurements obtained for the base stations 104 (block 416). The fine full-range time difference for two base stations 104 may be computed as follows. First, the coarse full-range time difference between the two base stations 104 is computed based on their coarse absolute time measurements (e.g., as the difference of the SFN values obtained for these base stations 104). Next, a fine partial-range time difference between the two base stations 104 is computed based on the relative time measurements obtained for the base stations 104. Relative time measurements for multiple base stations 104 may be combined in order to obtain the fine partial-range time difference for the two base stations 104. The fine full-range time difference is then obtained by combining the coarse full-range time difference and the fine partial-range time difference for the two base stations 104.

The RNC 110 may provide (report) time difference information for each of the base stations 104 under its control (block 418). The time difference information for each base station 104 includes at least one fine full-range time difference value computed for at least one neighbor base station 104. Each base station 104 may then transmit its time difference information over the air via the broadcast channel and/or dedicated channels to the terminals 106 under its coverage.

For an asynchronous system, the clocks used in each base station 104 are assumed to be independent from those in other base stations 104. Thus, the relative timing between the base stations 104 may continuously change due to their asynchronous clocks. The relative time measurements obtained from the terminals 106 and the time difference values provided to the terminal 106 are thus valid for a certain amount of time.

Fine reduced-range relative time measurements are thereafter obtained for the base stations 104 to be maintained virtually synchronized (block 420). Each such measurement may include just the chip-level time difference (i.e., with one frame of range), since the frame-level timing is already known and the frame-level time difference would not necessarily be needed. These measurements are then used to update the time difference values for the base stations 104 (block 422). Blocks 420 and 422 may be repeated periodically, as necessary. Or whenever possible, to ensure that up-to-date time difference information is provided to the terminals 106.

If it is determined (in block 424) that timing information is lost for a base station 104 (e.g., if it is reset or powered on), then the process may return to block 412 to restart the synchronization process for the base station 104. If it is determined (in block 426) that the ambiguity of the timing for a base station 104 exceeds a particular threshold (e.g., the ambiguity of the time difference values exceeds 256 or 2560 chips), then the process may return to block 414 to obtain a new fine partial-range relative time measurement for this base station 104. Otherwise, only fine reduced-range relative time measurements are needed to maintain the time difference information up to date, thus returning to block 420.

Figure 5:
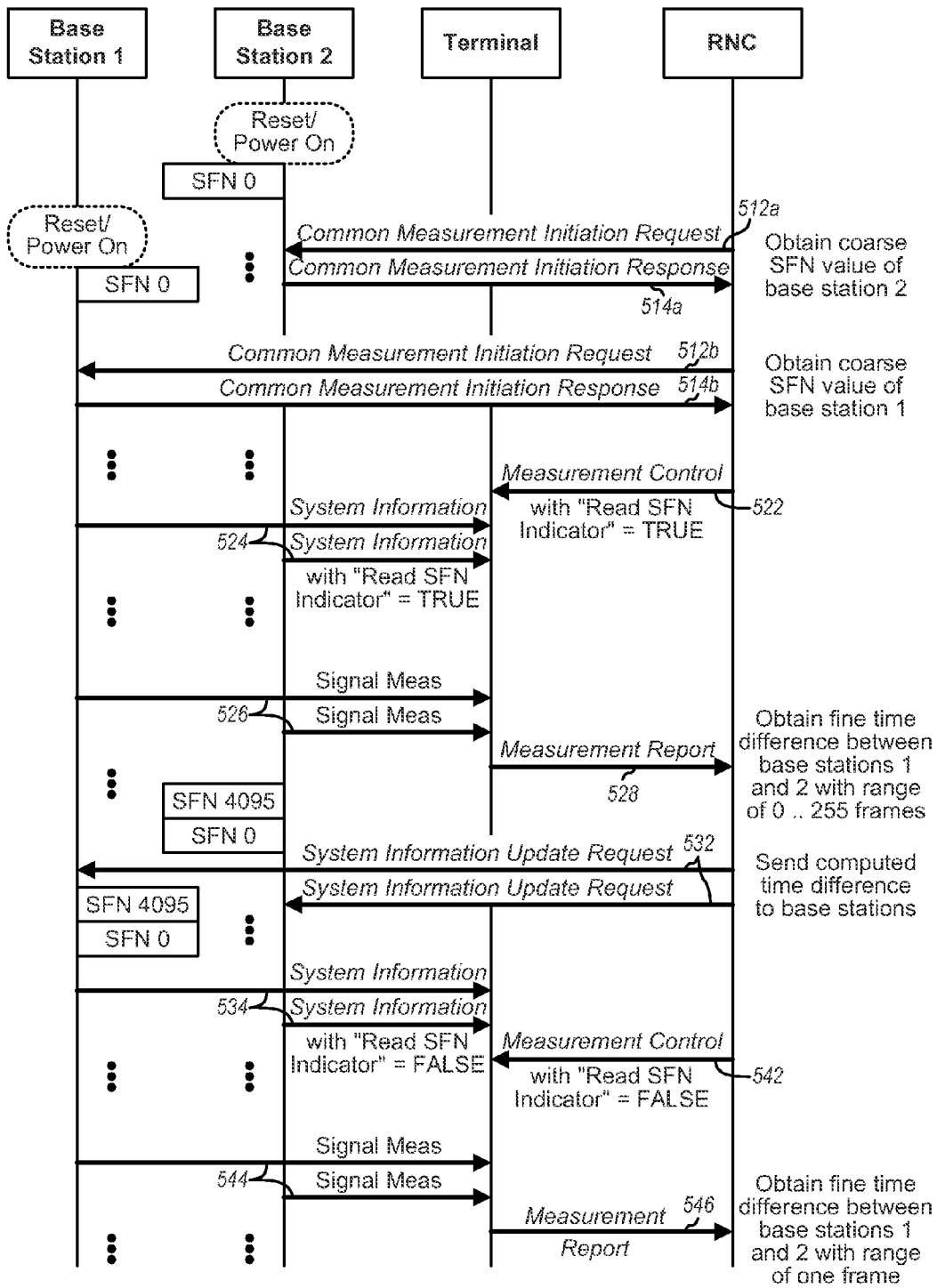
FIG. 5 shows a signal flow diagram for achieving virtual synchronization for base stations in a W-CDMA system.

FIG. 5 shows a signal flow diagram of an embodiment for performing virtual synchronization for base stations 104 in a W-CDMA system. For simplicity sake in illustrating the present invention, this exemplary signal flow diagram only shows the exchange of signaling between the RNC 110, two base stations 104, and one terminal 106. It will be appreciated, however, that the signaling exchange shown in the signal flow diagram of FIG. 5 may be implemented with more or fewer components of the system 100 without departing from the spirit and scope of the present invention.

For an asynchronous deployment, when a base station 104 is reset or powered on, it starts transmitting radio frames at an arbitrary time instant. The SFN value for the first radio frame transmitted by the base station 104 may be set to a predetermined value (e.g., zero) or an arbitrary value. In accordance with the W-CDMA standard, the base station 104 should meet frequency stability criteria. However, for an asynchronous deployment, the base station 104 need not necessarily keep a constant time offset with respect to neighbor base stations 104.

To obtain the coarse absolute time for each base station 104, the RNC 110 may perform a Node B Application Part (NBAP) procedure with the base station 104 by sending a Common Measurement Initiation Request message 512a,b to the base station 104 via an Iub interface, which is the interface between the base station 104 and the RNC 110. In response to the request from the RNC 110, the base station 104 provides the SFN value for its current radio frame via a Common Measurement Initiation Response message 514a,b. This reported SFN value is in the range of [0 . . . 4095], which is the full range for the SFN. However because of reporting and transmission delays, which may be as long as tens of frames, the SFN value received by the RNC 110 may have an uncertainly corresponding to the worst-case delays.

The common use of the SFN value returned by the base station 104 is to time stamp other measurement objects so that they may be properly related to each other. For the virtual synchronization process, this SFN value is used as the coarse absolute time for the base station 104. The NBAP procedure may be performed with each of the base stations 104 under the RNC's control to obtain the SFN value (and thus the coarse absolute time) for the base station 104. The NBAP procedure is described in a document 3GPP TS 25.433, entitled "UTRAN Iub Interface NBAP Signaling." which is publicly available.

To obtain the line partial-range relative time between base stations 104 (denoted as 1 and 2 in FIG. 5), the terminal 106 may be instructed to perform an SFN-SFN type 1 measurement. This instruction may be sent to the terminal 106 via a System Information message 524 on the BCCH, if the terminal 106 is in an idle mode or via a Measurement Control message 522 on a dedicated channel, if the terminal 106 is coupled with the base station 104 over the dedicated channel. These messages are described in detail in document 3GPP TS 25.331, entitled "Radio Resource Control Protocol Specification," which is also publicly available. The System Information message 524 originates from the base station 104, whereas the Measurement Control message 522 originates from the RNC 110. The System Information message 524 may be stored in the base station 104 and sent out periodically, whereas the Measurement Control message 522 is typically constructed at the RNC 110 each time the message is sent out. The signal flow for the Measurement Control message 522 is from the RNC 110 to the base station 104, and then from the base station 104 to the terminal 106. For simplicity sake in illustrating the present invention, FIG. 5 shows the Measurement Control message 522 as being sent directly from the RNC 110 to the terminal 106.

The System Information message 524 or the Measurement Control message 522 instructs the terminal 106 to measure each of the base stations 104 in the area and further indicates whether or not the SFN values of the base stations 104 should be obtained. If a base station 104 has just been activated or reset or if its timing is not known to better than one frame of uncertainty, then the terminal 106 is instructed to read the SFN value of that base station 104. This may be achieved by setting the information element "Read SFN indicator" to TRUE, as described above. The terminal 106 measures the signal (Signal Meas 526) received from each base station 104 and determines the time difference between each neighbor base station 104 (e.g., base station 2) and a reference base station 104 (e.g., base station 1). The terminal 106 then reports the frame-level time difference and the chip-level time difference for each neighbor base station 104 in a Measurement Report message 528 that is sent back to the RNC 110. The relative time measurement for each neighbor base station 104 has an accuracy of few chips and a range of [0 . . . 255] frames.

The RNC 110 may combine the coarse absolute time measurements (received via the Common Measurement Indication Response messages 514b from the base stations 104) with the fine relative time measurements (received via the Measurement Control message from the terminal 106). With these two pieces of time information, the RNC 110 may compute the fine lull-range time difference between the base stations 104. For this particular example, the RNC 110 may compute the fine full-range time difference between base stations 1 and 2 (with base station 1 being the reference base station 104) and the fine full-range time difference between base stations 2 and 1 (with base station 2 being the reference base station 104). The same computation may be extended for any number of base stations 104 under the RNC's control.

The RNC 110 then sends the time difference information to each base station 104 via a System Information Update Request message 532. The time difference information for a particular base station x includes (1) a computed time difference value (referred to as a "reference time difference" in W-CDMA) for each neighbor base station, with base station x as the reference base station, and (2) the resolution of each computed time difference value. The time difference information is thus different for each base station 104. Each base station 104 may then transmit its time difference information in a System Information message 534 (block type 11 or block type 12) to idle mode terminals 106 within its coverage area. The System Information messages 534 and the Measurement Control message 542 and block types 11 and 12 are described in the aforementioned document 3GPP TS 25.331.

If the relative timing between the base stations 104 is known to within a frame, then there is no need to have the terminal 106 determine and report frame-level timing. The terminal 106 may thus be instructed to provide the chip-level timing (and not the frame-level timing) in its Measurement Report messages. This is achieved by sending to the terminal 106 the System Information message 534 or a Measurement Control message 542 with the information element "Read SFN Indicator" set to FALSE. The terminal 106 will then not read the SFN values of neighbor base stations 104 in performing future relative time measurements (544), since the frame-level difference is already known, and Measurement Report message 546 sent by the terminal 106 would not include the frame-level difference.

For simplicity sake in illustrating the present invention, the signal flow for two base stations 104 is shown in FIG. 5. It will be appreciated, however, that the process may be extended to any number of base stations 104 without departing from the spirit and scope of the present invention. For each base station 104 to be maintained virtually synchronized, a fine full-range time difference value between a particular base station 104 and each neighbor base station 104 is obtained based on (1) a coarse full-range absolute time measurement for this base station 104, which may be obtained via the NBAP procedure with the base station 104, and (2) a fine partial-range relative time measurement for the particular base station 104, which may be obtained via measurements by the terminal 106.

Virtual synchronization may be maintained for all or a subset of the base stations 104 under the control of the RNC 110. If and when a particular base station 104 undergoes a reset (e.g., due to software or hardware failure), the RNC 110 may initiate the NBAP procedure with this base station 104 and obtain a partial-range relative time measurement for the base station 104, to virtually synchronize it with the other base stations 104. The reset of this base station 104 does not affect the operation of other base stations 104, which may continue to provide the benefits of virtual synchronization.

Virtual synchronization may also be maintained for base stations 104 under the control of multiple RNCs. In this case, a network entity (e.g., one of the RNCs) may be designated to receive all absolute time and relative time measurements and determine the time difference information for all base stations 104 to be maintained virtually synchronized.

As shown in FIG. 5, virtual synchronization may be achieved for base stations 104 in a W-CDMA system using existing signaling messages. However, these messages may be used for a new purpose that is different from the ones for which they were originally introduced in the standard.

The RNC 110 may continually update the time difference information for the base stations 104 based on new measurements received from the terminals 106. The asynchronous operation of the base stations 104 causes their relative timing to continually change over time. As long as there are terminals 106 that report the fine time difference for the base stations 104, the RNC 110 may update the time difference information for each base station 104 and send it to the terminals 106. If the time difference information for a given base station 104 is not updated by new measurements from the terminals 106, then the ambiguity in the time difference information may increase over time.

For a W-CDMA system, each tine difference value that is sent in a System Information message or a Measurement Control message is associated with a resolution. In particular, for W-CDMA, each time difference value may be sent with one of three possible resolutions: ±40 chips (highest accuracy), ±256 chips (intermediate or medium accuracy), and ±2560 chips (lowest accuracy). The resolution for each time difference value may be set based on the ambiguity in the measurements used to derive the time difference value. If the ambiguity of the measurements (or the lack of new measurements) is such that the resolution of a time difference value exceeds 2560 chips, then this time difference value is not provided to the terminals 106.

Higher accuracy for the time difference values typically corresponds to a shorter search time. The RNC 110 may be operated to attempt to achieve the highest possible accuracy for the time difference information sent to the terminals 106. This may be achieved in various manners.

In one embodiment, if the RNC 110 detects that the accuracy of the time difference information for a particular base station 104 is degraded worse than a particular threshold, then it may instruct the terminals 106 within the coverage of the particular base station 104 to measure and report the frame-level and chip-level time differences for the particular base station 104. The RNC 110 may then update the time difference information for particular base station 104 based on the new measurements received from the terminals 106 and send out updated time difference information.

In another embodiment, the RNC 110 estimates the drifts in the timing of the base stations and updates the time difference information based on the estimated timing drifts. Whenever a new time difference measurement is received for a given base station x, the change in the timing of base station x with respect to the timing of a reference time source (e.g., the RNC 110, the GPS system, or a designated base station 104) is determined. The rate of drift in the timing of base station x and the variance of the timing drift may be computed based on a sufficient number of measurements for base station x. Thereafter, if no measurements are received for base station x (e.g., because there are no terminals 106 in the coverage area of base station x, then the RNC 110 may estimate the current timing of base station x based on the estimated timing drift. The accuracy of the estimated timing for base station x is dependent on the estimated variance of the timing drift. The time difference information for base station x may thus be updated based on the estimated timing for the base station.

Figure 6:
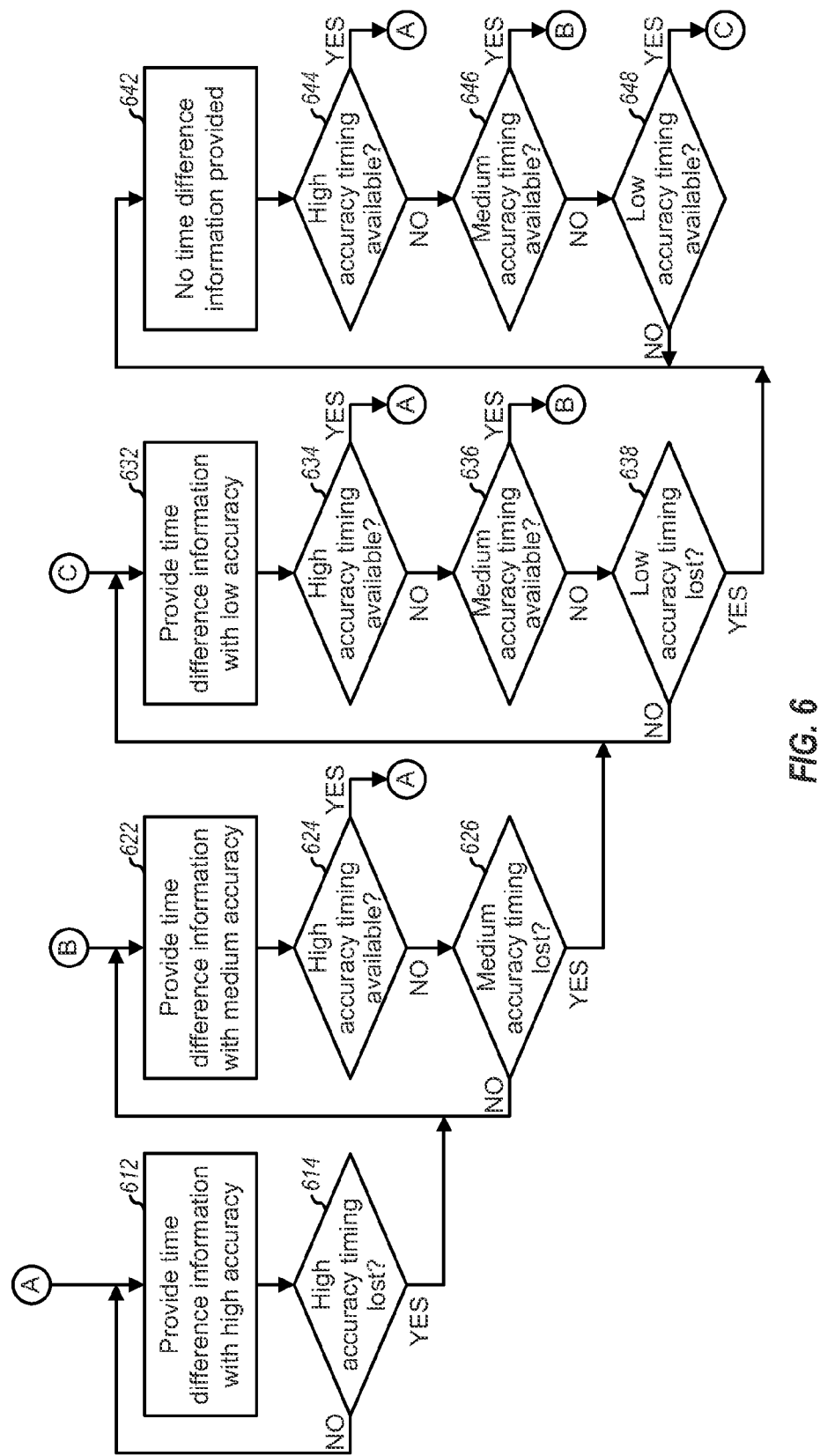
FIG. 6 shows a flow diagram for providing time difference information with the best possible resolution for a particular base station.

FIG. 6 shows a flow diagram of an embodiment to provide (e.g., report) time difference information with the best possible resolution for a particular base station x. The process flow may be performed by the RNC 110 or a network entity designated to determine and provide time difference information for the base stations 104.

Initially, the time difference information for base station x is obtained, for example, using the process shown in FIG. 4. Time difference information with high accuracy (e.g., ±40 chips accuracy) is then provided to base station x for broadcast to the terminals (block 612). Thereafter, a determination is made whether or not high accuracy timing for base station x is lost (block 614). If high accuracy timing is not lost, then the process returns to block 612 and provides time difference information with high accuracy.

If the answer to block 614 is yes and high accuracy timing is lost, then time difference information with medium accuracy (e.g., ±256 chips accuracy) is provided to base station x for broadcast to the terminals 106 (block 622). Thereafter, a determination is made whether or not high accuracy timing for base station x is available (block 624). If the answer is yes (e.g., because new measurements have been obtained for base station x), then the process returns to block 612 and provides time difference information with high accuracy. Otherwise, if high accuracy timing is not available, then a determination is made whether or not medium accuracy timing for base station x is lost (block 626). If medium accuracy timing is not lost, then the process returns to block 622.

If the answer to block 626 is yes and medium accuracy timing is lost, then time difference information with low accuracy (e.g., ±2560 chips accuracy) is provided to base station x for broadcast to the terminals (block 632). Thereafter, the process returns to block 612 if it is determined in block 634 that high accuracy timing information is available for base station x and returns to block 622 if it is determined in block 636 that medium accuracy timing information is available. Otherwise, a determination is made whether or not low accuracy timing for base station x is lost (block 638). If low accuracy timing is not lost, then the process returns to block 632.

If the answer to block 638 is yes and low accuracy timing is lost, then no time difference information is provided to base station x (block 642). Thereafter, the process returns to block 612 if it is determined in block 644 that high accuracy timing information is available for base station x, returns to block 622 if it is determined in block 646 that medium accuracy timing information is available, and returns to block 632 if it is determined in block 648 that low accuracy timing information is available. Otherwise, the process returns to block 642 and provides no time difference information.

High, medium, and low accuracy timing may be deemed to have been lost for base station x, for example, based on the amount of elapsed time since a fine relative time measurement report was last received for base station x. For example, high, medium, and low accuracy timing may be deemed to have been lost if the elapsed time since the last measurement report exceeds $T_{high}$, $T_{med}$, and $T_{low}$, respectively, where $T_{high} < T_{med} < T_{low}$. $T_{high}$, $T_{med}$, and $T_{low}$ may be any suitable values, and may be selected based on the estimated drifts in the timing of the base stations.

Once a terminal 106 receives the time difference information from its serving base station 104, the terminal 106 may obtain the benefits of a synchronized system even though the base stations 104 are not synchronous. The serving base station 104 is used as the reference base station 104 in the time difference information it provides.

With synchronization, the search for neighbor base stations 104 may be greatly reduced by knowing the timing of each base station 104. In particular, the search for a neighbor base station y may be performed within a smaller search window centered about the time instant where base station y is expected to be found, instead of the entire search space (which is typically an entire frame, or 38,400 chips, for W-CDMA). The time instant is determined by the timing of base station y, which is estimated based on the fine relative time between base station y and the reference base station. The size of the search window for base station y is determined by the ambiguity in the time difference value for the base station 104.

With synchronization, the terminal 106 does not need to obtain frame-level timing for a neighbor base station 104 if the terminal 106 has knowledge or the timing for the base station 104. The terminal 106 would not need to process the BCCH to obtain the SFN value. This results in shorter time required to obtain and report the relative time measurement for the neighbor base station 104.

Figure 7:
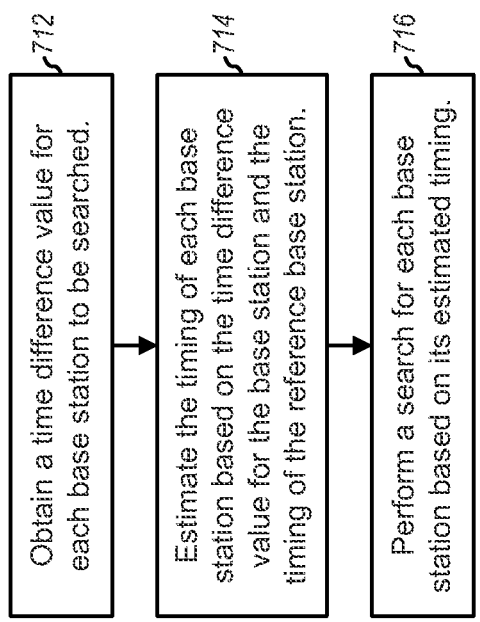
FIG. 7 shows a flow diagram for a terminal for searching for neighbor base suctions in a virtually synchronized system.

FIG. 7 shows a flow diagram of an embodiment performed by a terminal 106 to search for neighbor base stations 104 in a virtually synchronized wireless communication system 100. Initially, a time difference value for each of at least one base station 104 to be searched is obtained (e.g., from the serving base station 104, via a System Information message and/or a Measurement Control message) (block 712). The time difference value for each base station 104 is indicative of the difference between the timing of that base station 104 and the timing of the serving/reference base station 104.

The timing of each base station 104 to be searched is then estimated based on the time difference value for that base station 104 and the timing of the serving base station 104 (block 714). A search for each base station 104 is then performed based on the estimated timing for that base station 104 (black 716). Each time difference value may further be associated with a resolution. In this case, the search for each base station 104 may be performed based on the resolution of the time difference value for that base station 104.

3. System

Figure 8:
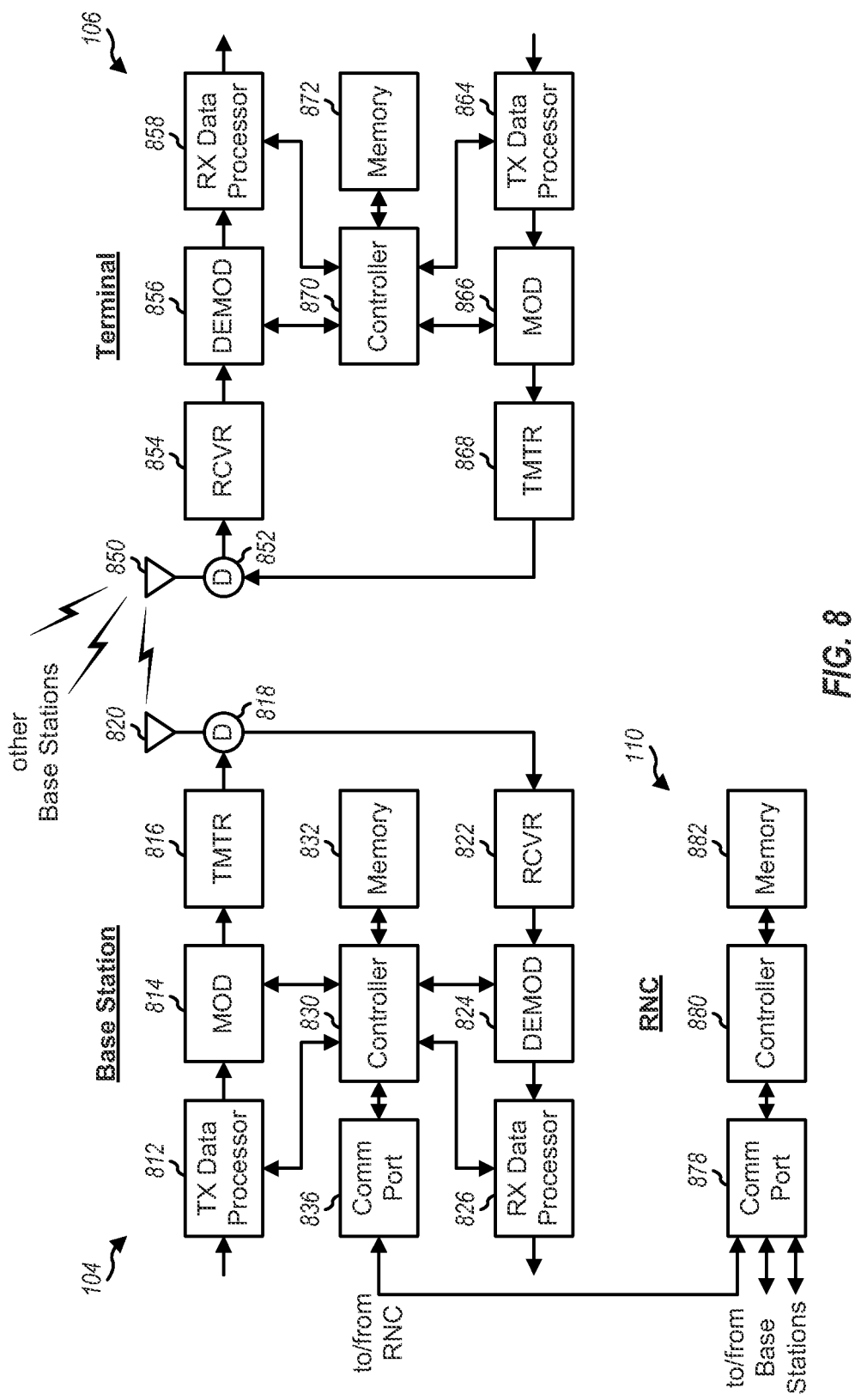
FIG. 8 is a simplified block diagram of a base station and a terminal.

FIG. 8 is a simplified block diagram of an embodiment of base station 104 and terminal 106. For simplicity sake in illustrating the present invention, only one base station 104 and one terminal 106 are shown in FIG. 8. However, terminal 106 may concurrently communicate with multiple base stations 104 when in soft handover and may further receive messages from other neighbor base stations 104.

At base station 104 on the downlink, user-specific data, which provides signaling to identify synchronous and asynchronous base stations and requests for time difference measurements are provided to a transmit (TX) data processor 812. The transmit (TX) data processor 812 formats and encodes the data and messages based on one or more coding schemes to provide coded data. Each coding scheme may include any combination of cyclic redundancy check (CRC), convolutional. Turbo, block, and other coding. Alternatively, no coding may be performed at all. Typically, data and messages are coded using different schemes, and different types of messages may also be coded differently.

The coded data is then provided to a modulator (MOD) 814 and further processed to generate modulated data. The processing by modulator 814 may include (1) covering the coded data with orthogonal codes (e.g., orthogonal variable spreading factor (OVSF) codes) to channelize the user-specific data and messages into their respective dedicated and control channels and (2) scrambling the covered data with PN sequences assigned to the terminal 106. The modulated data is then provided to a transmitter unit (TMTR) 816 and conditioned (e.g., converted to one or more analog signals, amplified, filtered, and frequency upconverted) to generate a downlink signal suitable for transmission over a wireless link. The downlink signal is then routed through a duplexer (D) 818 and transmitted via an antenna 820 to the terminals 106.

At terminal 106, the downlink signal is received by an antenna 850, routed through a duplexer (D) 852, and provided to a receiver unit (RCVR) 854. Receiver unit 854 conditions (e.g., filters, amplifies, frequency downconverts, and digitizes) the received signal to provide samples. A demodulator (DEMOD) 856 then receives and processes the samples to provide recovered symbols. The processing by demodulator 856 includes descrambling the samples with PN sequences aligned to the signal arrival times of the multipaths being processed, decovering the descrambled samples to channelize the received data and messages into their respective dedicated and control channels, and (coherently) demodulating the decovered data with a recovered pilot. Demodulator 856 may implement a rake receiver that may process multiple instances of the received signal and combine symbol estimates from various multipaths belonging to the same base station 104 to provide the final symbol estimates.

A receive (RX) data processor 858 then decodes the final symbol estimates to recover the user-specific data and messages transmitted on the downlink. The recovered messages may be provided to a controller 870. The processing by demodulator 856 and RX data processor 858 is complementary to that performed by modulator 814 and TX data processor 812 at base station 104, respectively.

Demodulator 856 may further be operated to determine the signal arrival times of the received base stations (e.g., based on the timing of the PN sequences generated by the terminal 106) and to derive the chip-level time difference between two base stations 104 based on the signal arrival times, as directed by controller 870. Alternatively, the signal arrival times may be determined by demodulator 856 and provided to controller 870, which may then determine the chip-level time difference. RX data processor 858 may further be operated to recover and provide the system frame numbers for the common channel frames for one or more received base stations 104 (e.g., the candidate and reference base stations), as directed by controller 870. Controller 870 may then determine the frame-level time difference, if desired.

Controller 870 may receive information regarding which base stations 104 require frame-level timing and which do not, and may further receive the request for time difference measurements. Controller 870 then directs demodulator 856 to provide the chip-level timing information for the received base stations 104 and further directs RX data processor 858 to provide the frame-level timing information for certain base stations 104 for which such information is required. Controller 870 then forms an information element "SFN-SFN type 1" for a Measurement Report message for the received base stations.

At terminal 106 on the uplink, the SFN-SFN type 1 measurement report message is provided to a TX data processor 864, which then processes the report message in accordance with a defined processing scheme. The processed message is then further processed (e.g., covered and scrambled) by a modulator (MOD) 866 and conditioned by a transmitter unit (TMTR) 868 to generate an uplink signal, which is then routed through duplexer (D) 852 and transmitted via antenna 850 to the base stations 104.

At base station 104, the uplink signal is received by antenna 820, routed through duplexer 818, and provided to a receiver unit (RCVR) 822. Receiver unit 822 conditions the received signal and provides samples. The samples are then processed (e.g., descrambled, decovered, and data demodulated) by a demodulator (DEMOD) 824 and decoded (if necessary) by an RX data processor 826 to recover the transmitted report message. The recovered report message is then provided to a controller 830, which may forward the report message to the RNC 110 or some other system entity. The signal strength and time difference information included in the report message may be used to select one or more base stations 104 for inclusion in the terminal's active set and to properly time-align the downlink transmissions from the selected base stations 104.

Controller 870 may further receive time difference information from its serving base station 104. Controller 870 may then initiate search for neighbor base stations 104 based on the received time difference information, as described above. Controller 870 may be operated to implement the process shown in FIG. 7.

In FIG. 8, RNC 110 includes a communication port 878, a controller 880, and a memory unit 882. Communication ports 836 and 878 allow base station 104 and RNC 110 to exchange signaling (e.g., for virtual synchronization). Controller 880 receives the absolute time measurements and the relative time measurements, determines the time difference information for each base station 104 under its control in the manner described above, and provides the time difference information to each base station, which may then send the information over the air to the terminals 106 operating in its coverage area. Controller 880 may be operated to implement the process shown in FIG. 4.

In general, controllers 830, 870, and 880 control the operation of various processing units at the base station 104, terminal 106, and RNC 110, respectively. Memory units 832, 872, and 882 store data and program codes used by controllers 830, 870, and 880, respectively.

The techniques for time-aligning transmission described herein may be implemented by various means. For example, the processing at the terminal 106 and base station 104 for these techniques may be implemented in hardware, software, or a combination thereof. For a hardware implementation, the elements used to perform the processing for these techniques may be implemented with a digital signal processor (DSP), an application specific integrated circuit (ASIC), a processor, a microprocessor, a controller, a microcontroller, a field programmable gate array (FPGA), a programmable logic device, other electronic units, or any combination thereof. Some of the functions and processing described herein may also be implemented with software executed on a processor. For example, the estimation of the chip-level and frame-level time differences and the encapsulation of the time difference measurements into the information element "SFN-SFN type 1" included in the Measurement Report message may be performed by controller 870.

For clarity, various aspects, embodiments, and schemes have been described specifically for the SFN-SFN type 1 measurement in the W-CDMA standard. The frame-level timing and chip-level timing may also be reported via other mechanisms. For example, W-CDMA supports the reporting of a parameter Tm for chip-level timing, and parameters OFF and COUNT-C-SFN for frame-level timing. These parameters are described in further detail in Document No. 3GPP TS 25.402. Section 5.

Headings are included herein for reference and to aid in locating certain sections. These headings are not intended to limit the scope of the concepts described therein, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications, wherein the method is performed by a radio network controller, the method comprising:
   receiving coarse time measurements from first and second base stations;
   receiving fine time measurements for the first and second base stations;
   computing a time difference between the first and second base stations based on the coarse time measurements and the fine time measurements; and
   sending the time difference to at least one of the first and second base stations.

2. The method as in claim 1 wherein each of the coarse time measurements is a frame-level time measurement and each of the fine time measurements is a chip-level measurement.

3. The method as in claim 1 wherein the time difference is a fine full-range time difference, said method further comprising computing the fine full-range time difference by:
   computing a coarse full-range time difference between the first and second base stations;
   computing a fine partial-range time difference between the first and second base stations; and
   computing the fine coarse full-range time difference by combining the full-range time difference and the fine partial-range time difference.

4. The method as in claim 3 further comprising computing a difference of system frame numbers of the first and second base stations as the coarse full-range time difference.

5. The method as in claim 3 further comprising computing a difference of relative time measurements of the first and second base stations as the fine partial-range time difference.

6. A radio network controller operable in a communication system, comprising:
   means for receiving coarse time measurements from first and second base stations;
   means for receiving fine time measurements for the first and second base stations;
   means for computing a time difference between the first and second base stations based on the coarse time measurements and the fine time measurements; and
   means for sending the time difference to at least one of the first and second base stations.

7. The radio network controller as in claim 6 wherein each of the coarse time measurements is a frame-level time measurement and each of the fine time measurements is a chip-level measurement.

8. The radio network controller as in claim 6 wherein the time difference is a fine full-range time difference, said radio network controller further comprising:
   means for computing a coarse full-range time difference between the first and second base stations;
   means for computing a fine partial-range time difference between the first and second base stations; and
   means for computing the fine coarse full-range time difference by combining the full-range time difference and the fine partial-range time difference.

9. The radio network controller as in claim 8 further comprising means for computing a difference of system frame numbers of the first and second base stations as the coarse full-range time difference.

10. The radio network controller as in claim 8 further comprising means for computing a difference of relative time measurements of the first and second base stations as the fine partial-range time difference.

11. A radio network controller operable in a communication system, comprising:
   a controller; and
   circuitry coupled to the controller configured to:
      receive coarse time measurements from first and second base stations;
      receive fine time measurements for the first and second base stations;
      compute a time difference between the first and second base stations based on the coarse time measurements and the fine time measurements; and
      send the time difference to at least one of the first and second base stations.

12. The radio network controller as in claim 11 wherein each of the coarse time measurements is a frame-level time measurement and each of the fine time measurements is a chip-level measurement.

13. The radio network controller as in claim 11 wherein the time difference is a fine full-range time difference, the circuitry and the controller are further configured to:
   compute a coarse full-range time difference between the first and second base stations;
   compute a fine partial-range time difference between the first and second base stations; and
   compute the fine coarse full-range time difference by combining the full-range time difference and the fine partial-range time difference.

14. The radio network controller as in claim 13 wherein the circuitry and the controller are further configured to compute a difference of system frame numbers of the first and second base stations as the coarse full-range time difference.

15. The radio network controller as in claim 13 wherein the circuitry and the controller are further configured to compute a difference of relative time measurements of the first and second base stations as the fine partial-range time difference.

* * * * *